(12) United States Patent
Denoual et al.

(10) Patent No.: US 10,171,541 B2
(45) Date of Patent: Jan. 1, 2019

(54) METHODS, DEVICES, AND COMPUTER PROGRAMS FOR IMPROVING CODING OF MEDIA PRESENTATION DESCRIPTION DATA

(71) Applicant: CANON KABUSHIKI KAISHA, Tokyo (JP)

(72) Inventors: Franck Denoual, Saint Domineuc (FR); Frédéric Maze, Langan (FR); Yuki Fujimori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 14/971,895

(22) Filed: Dec. 16, 2015

(65) Prior Publication Data

US 2016/0182593 A1 Jun. 23, 2016

(30) Foreign Application Priority Data

Dec. 23, 2014 (GB) .................................. 1423140.1

(51) Int. Cl.
*H04L 29/06* (2006.01)
*H04N 21/845* (2011.01)
*H04N 21/235* (2011.01)
*H04N 21/435* (2011.01)
*H04L 12/46* (2006.01)
*H04N 21/234* (2011.01)
*H04N 21/2343* (2011.01)

(52) U.S. Cl.
CPC ........ *H04L 65/607* (2013.01); *H04L 12/4633* (2013.01); *H04L 65/605* (2013.01); *H04N 21/2353* (2013.01); *H04N 21/23418* (2013.01); *H04N 21/23439* (2013.01); *H04N 21/435* (2013.01); *H04N 21/8456* (2013.01); *H04L 69/22* (2013.01)

(58) Field of Classification Search
CPC ....................................................... H04L 67/02
USPC ........................................................ 709/219
See application file for complete search history.

(56) References Cited

U.S. PATENT DOCUMENTS 8,495,675 B1 7/2013 Philpott et al.
2014/0195651 A1* 7/2014 Stockhammer .. H04N 21/23439
709/219
2014/0281010 A1* 9/2014 Panje ..................... H04L 65/60
709/231

* cited by examiner

*Primary Examiner* — Vivek Srivastava
*Assistant Examiner* — Sibte H Bukhari
(74) *Attorney, Agent, or Firm* — Canon USA, Inc. I.P. Division

(57) ABSTRACT

The invention relates to improving coding of media presentation description data. Requesting streamed timed media data associated with a media item, organized into temporal media segments, the streamed timed media data belonging to partitioned timed media data comprising timed samples, the streamed timed media data being transmitted as media segment files each comprising independently processed components resulting from processing the timed samples, including receiving a manifest comprising metadata for describing the processed components, the metadata comprising parameters used for describing a part of one of the processed components, wherein one of the parameters is a dynamic parameter which value can vary over time, the parameter being associated with an element referring to a metadata resource, external to the manifest and comprising a value defining the parameter; and requesting the streamed timed media data based on metadata of the manifest and of the value defining the parameter.

17 Claims, 10 Drawing Sheets

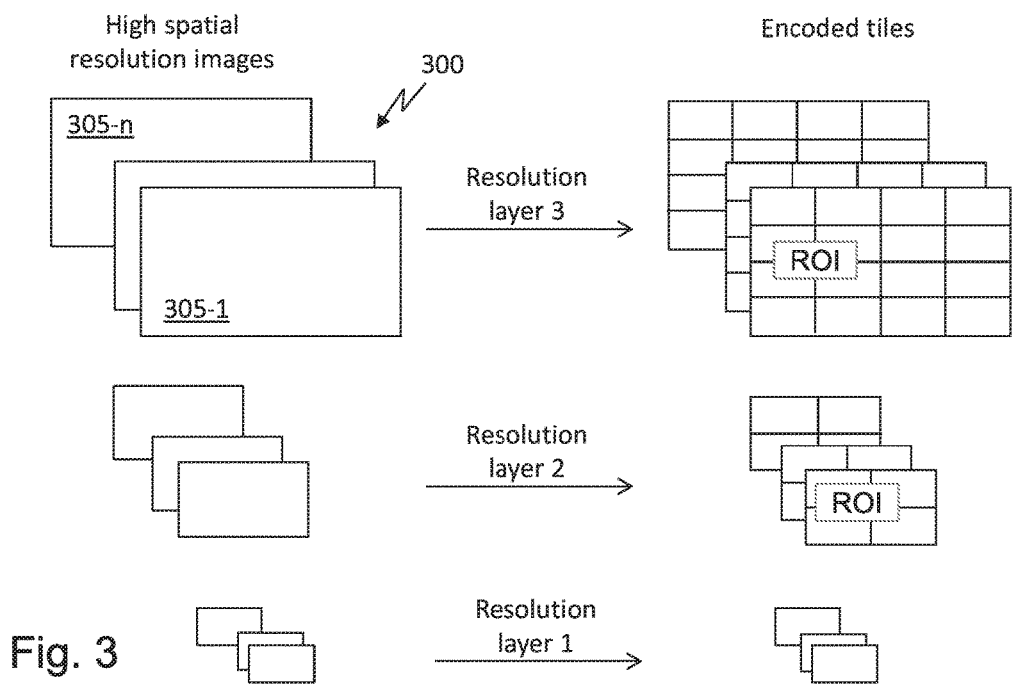
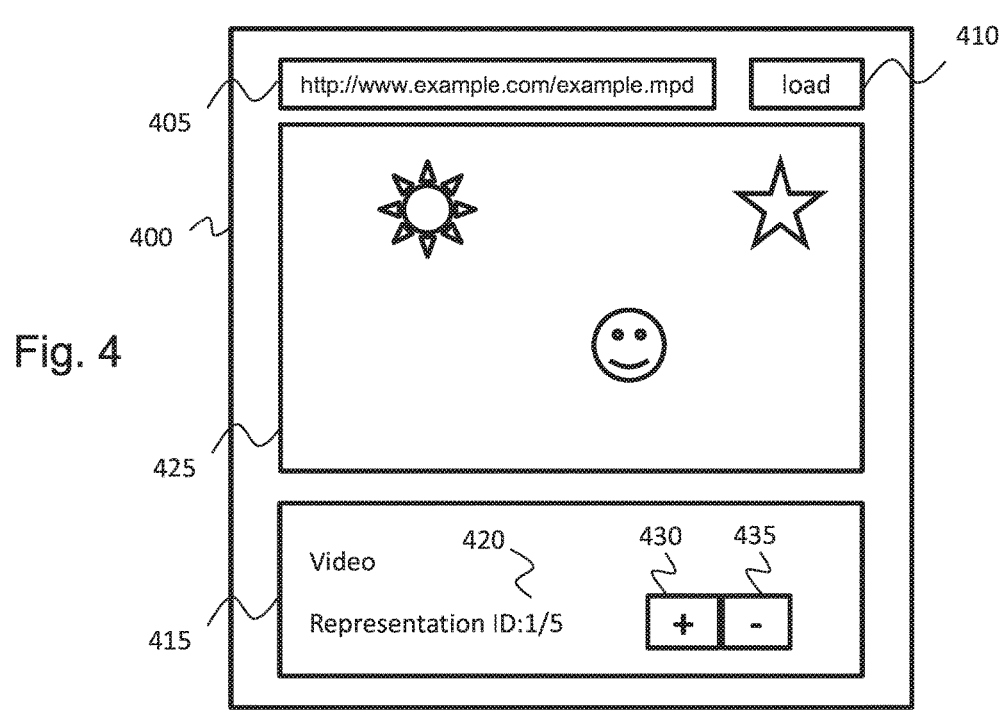

```
<?xml version="1.0"?>
<MPD ... >
 <BaseURL>http://www.example.com/videos/</BaseURL>                705
 <Period ... >
  <SegmentTemplate media="$RepresentationID$-$Number$.mp4" .../>
  <AdaptationSet ...>     <!-- full video 501 and tiled full video 502 -->
   <Representation id="1" ... > ... </Representation>  710
   <Representation id="2" ... > ... </Representation>  715
  </AdaptationSet>
  <AdaptationSet ... >    <!-- Detected object 503 -->
   <Representation id="3" ... > ... </Representation>  720
  </AdaptationSet>
  <AdaptationSet ... >    <!-- Detected object 504 -->
   <Representation id="4" ... > ... </Representation>  725
  </AdaptationSet>
  <AdaptationSet ... >    <!-- Detected object 505 -->
   <Representation id="5" ... > ... </Representation>  730
  </AdaptationSet>
 </Period>
</MPD>
```
                                                                  700

Fig. 7

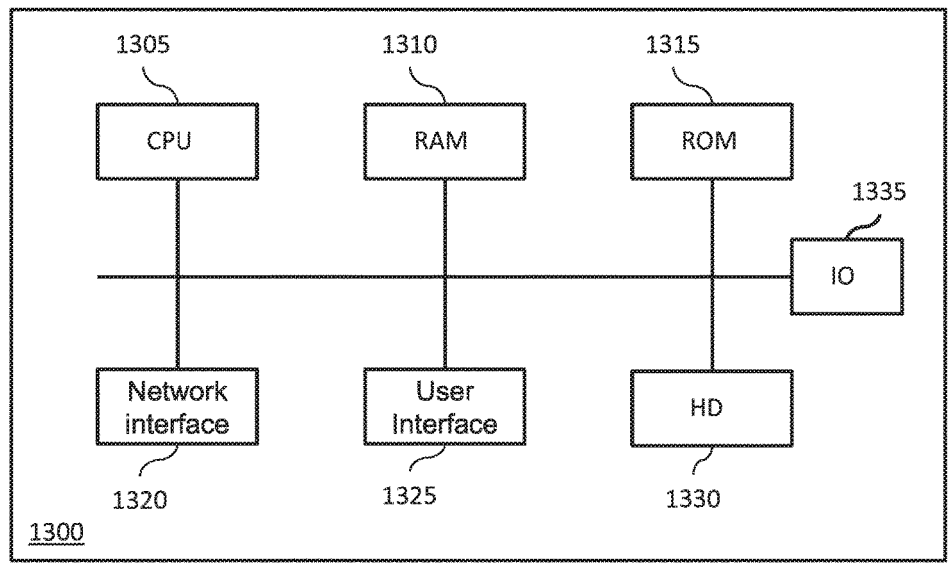

Fig. 13

```
<?xml version="1.0"?>
<MPD ... >
 <BaseURL>http://www.example.com/videos/</BaseURL>                805
 <Period ...>                                                      /\/
   <SegmentTemplate media="$RepresentationID$/$Number$.mp4" .../>          /\, 800
   <AdaptationSet ...>    <!-- 1 Representation for all objects -->
     <Representation id="!ObjectID!" ... > ... </Representation> /\, 810
   </AdaptationSet >
 </Period>
</MPD>
```

Fig. 8a

```
<?xml version="1.0"?>
<MPD ... >
 <BaseURL>http://www.example.com/videos/</BaseURL>
 <Period ...>                                                      820
   <SegmentTemplate                                                 /\/
media="$AdaptationSet$/$RepresentationID$/$Number$.mp4" .../>
   <!-- 1 AdaptationSet for all objects -->
   <AdaptationSet id ="!AS_ID!"...> /\, 825
     <!-- 1 Representation for all objects -->
     <Representation id="!ObjectID!" ... > ... </Representation> /\, 830
   </AdaptationSet >                                                        /\, 815
 </Period>
</MPD>
```

Fig. 8b

```
...
<AdaptationSet contentType='video'>                                          905
  <SegmentTemplate media="$RepresentationID$-$Number$.mp4" />          910
  <Representation associationID='Rm' id='!ObjectID!' ... </Representation>
</AdaptationSet>                  920              915

<AdaptationSet contentType='text' codec='mett'> // metadata text track
  <SegmentTemplate media="$RepresentationID$-$Number$.mp4" />    930
  <Representation id='Rm' bandwidth='1000' ... > ... </Representation>  925
</AdaptationSet>
...
```

Fig. 9a

```
                                                                          951
<AdaptationSet contentType='video' ... >
  <SegmentTemplate media="$RepresentationID$-$Number$.mp4" />   952
  <Representation @associationID='Rm' id='!ObjectID!_low' bandwidth='!ObjectBW!' ..>
   ...                                        953                       954
  </Representation>
  <Representation @associationID='Rm' id='!ObjectID!_mid' bandwidth='!ObjectBW!' ..> 950
   ...
  </Representation>
</AdaptationSet>

<AdaptationSet contentType='text' codec='mett' ...> // metadata text track
  <SegmentTemplate media="$RepresentationID$-$Number$.mp4" />
  <Representation id='Rm' bandwidth='1000'></Representation>
</AdaptationSet>
...
                                                                          955
```

Fig. 9b

```
...
<AdaptationSet contentType='video'>
  <SegmentTemplate media="$RepresentationID$-$Number$.mp4" />
  <Representation bandwidth='!VIDEO_BW!' id='vid1' ...> ... </Representation>
</AdaptationSet>

<AdaptationSet contentType='text' codec='mett'> // metadata text track
  <SegmentTemplate media="$RepresentationID$-$Number$.mp4" />
  <Representation id='Rm' associationID='vid1' associationType='dtpr' ... >
  </Representation>
</AdaptationSet>
...
```

Fig. 9c

```
...
<AdaptationSet contentType='video' ... >
  <SegmentTemplate media="$RepresentationID$-$Number$.mp4" />
  <Representation id='!ObjectID!_low' bandwidth='!ObjectBW!' ...>
    ...
  </Representation>
  <Representation id='!ObjectID!_mid' bandwidth='!ObjectBW!' ...>
    ...
  </Representation>
</AdaptationSet>
...
```

Fig. 9d

"Low" representation

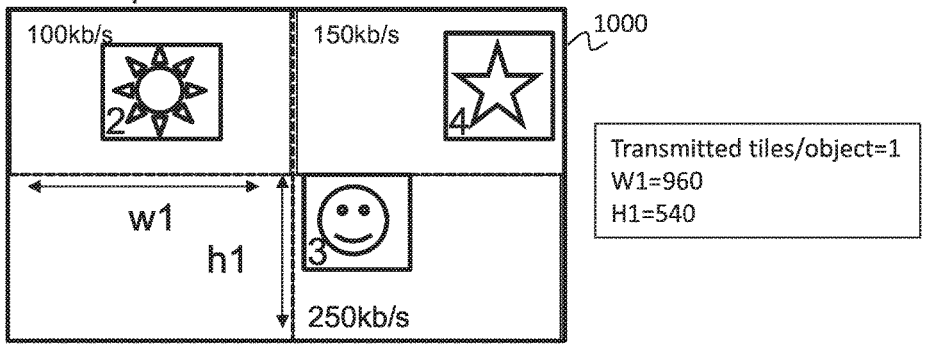

"High" representation

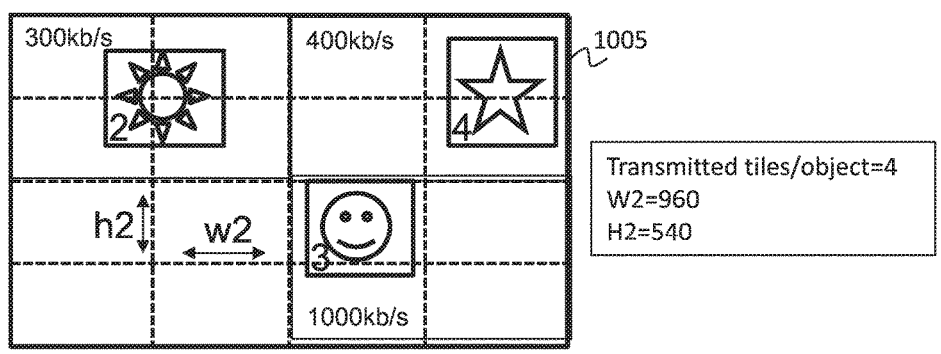

```
<MPD...>
<Period...>...
<AdaptationSet>
 <SegmentTemplate media="$RepresentationID$-$Number$.mp4" />
 <Representation id='!ObjectID!_low' bandwidth='250000' width='960' height='540'> ... </Representation>
 <Representation id='!ObjectID!_high' bandwidth='1000000' width='1920' height='1080'>... </Representation>
...
</AdaptationSet>
>/Period>
</MPD>
```

Fig. 10

METHODS, DEVICES, AND COMPUTER PROGRAMS FOR IMPROVING CODING OF MEDIA PRESENTATION DESCRIPTION DATA

This application claims the benefit under 35 U.S.C. § 119(a)-(d) of United Kingdom Patent Application No. GB 1423140.1, filed on Dec. 23, 2014 and entitled "methods, devices, and computer programs for improving coding of media presentation description data". The above cited patent application is incorporated herein by reference in its entirety.

FIELD OF THE INVENTION

The invention generally relates to the field of timed media data streaming over communication networks, for example communication networks conforming to Internet Protocol (IP) standard. More particularly, the invention concerns methods, devices, and computer programs for improving coding of media presentation description data, allowing the use of dynamic template parameters in dynamic adaptive streaming using the HyperText Transfer Protocol (HTTP).

BACKGROUND OF THE INVENTION

Video coding is a way of transforming a series of video images into a compact digitized bitstream so that the video images can be transmitted or stored. An encoding device is used to code the video images, with an associated decoding device being available to reconstruct the bitstream for display and viewing. A general aim is to form the bitstream so as to be of smaller size than the original video information. This advantageously reduces the capacity required of a transfer network, or storage device, to transmit or store the bitstream code. To be transmitted, a video bitstream is generally encapsulated according to a transmission protocol that typically adds headers and check bits.

Streaming media data over a communication network typically means that the data representing a media presentation are provided by a host computer, referred to as a server, to a playback device, referred to as a client device, over the communication network. The client device is generally a media playback computer implemented as any of a variety of conventional computing devices, such as a desktop Personal Computer (PC), a tablet PC, a notebook or portable computer, a cellular telephone, a wireless handheld device, a personal digital assistant (PDA), a gaming console, etc. The client device typically renders a streamed content as it is received from the host (rather than waiting for an entire file to be delivered).

FIG. 1 illustrates an example of an information technology architecture 100 for streaming media data from a server 105 to a client device 110 over a communication network 115.

A media presentation generally comprises several media components such as audio, video, text, and/or subtitles that can be sent from a server to a client device for being jointly played by the client device. Those media components are typically encoded individually into separate media streams and next, they are encapsulated into multiple media segments, either together or individually, and sent from a server to a client device for being jointly played by the latter.

A shared practice aims at giving access to several versions of the same media component so that the client device can select one version as a function of its characteristics (e.g. resolution, computing power, and bandwidth). According to the existing proprietary solutions each of the alternative versions is described and media data are segmented into small temporal segments.

In the context of the dynamic and adaptive streaming over HTTP, a new standard called DASH (Dynamic Adaptive Streaming over HTTP) has recently emerged from the MPEG standardization committee ("ISO/IEC 23009-1, Dynamic adaptive streaming over HTTP (DASH), Part1: Media presentation description and segment formats"). This standard enables association of a compact description of the media content of a media presentation with HTTP Uniform Resource Locations (URLs).

Such an association is typically described in a file called a manifest file or a description file. In the context of DASH, this manifest file is an XML file also called the MPD file (Media Presentation Description).

By receiving an MPD file, a client device gets the description of each media content component. Accordingly, it is aware of the kind of media content components proposed in the media presentation and knows the HTTP URLs to be used for downloading the associated media segments. Therefore, the client device can decide which media content components to download (via HTTP requests) and to play (i.e. to decode and to play after reception of the media segments).

In addition to such an association, the DASH standard proposes to split each media content as a function of periods of time. The time decomposition is described in the MPD file. Accordingly, the latter defines the association between HTTP URLs and the compact description of each component from media content over each period of time. Each media content component can be encapsulated into multiple independent media segments corresponding to these periods of time.

This standard allows a client to download desired media content components of a media presentation over desired periods of time.

The encapsulation file format used for streaming media content components within media segments in MPEG DASH may conform to the ISO Base Media File Format defined in the context of the MPEG standardization activity. In particular, the encapsulation file format may relate to the standardization of the encapsulation of the High Efficiency Video Coding (HEVC) and its scalable extension in the ISO Base Media File Format (ISO/IEC 14496 Part 15), especially when using HEVC tiles for Regions-of-Interest (ROIs) and more generally for spatial access in compressed videos.

It is to be noted that extraction/streaming and displaying of regions of interest relying on tile composition is particularly useful for enabling interactive high quality zoom-in functions during streaming, for example for tracking a particular object that is represented in the images.

FIG. 2 illustrates modules of a server, for example of the server 105 represented in FIG. 1, that is configured for providing a video stream.

As illustrated, server 105 comprises video source 200, for example a camera, producing sequences of images that can be encoded by encoding module 205. An object recognition module 210 is used to identify and locate one or several objects that can be tracked through a sequence of images to define regions of interest. These objects can be determined by image analysis after encoding or prior to encoding (as suggested with dotted line).

The detected objects move in the images over time and thus, potentially overlap at some point in time, appear or disappear.

It is to be noted that the object recognition or detection step can be carried out offline, before the transmission of the video through a communication network, or online during encoding of the images issued by the video source and transmission of the encoded images.

As illustrated, the encoded images are segmented into segments in segmentation module 215 before being possibly transmitted, depending on client requests, through a communication network via communication module 220.

According to the illustrated example, each detected object is associated with a region of interest that consists in one or more tiles in an HEVC encoded video, also referred to as partitions. Therefore, object/tile coverage module 225 is used for providing a set of tiles covered by the region of interest associated with one, some or all of the detected objects.

Manifest generation module 230 is used to generate a manifest that is transmitted to a client device for accessing video segments.

Since the generated manifest comprises a description of all the required adaptation sets (i.e. one for the main video stream and one for each of the region of interest), the manifest comprises redundant data.

Generally speaking, a main feature of the manifest based streaming methods is directed to decomposing media contents in small temporal entities referred to as segments. The manifest then provides the list of HTTP URLs for all the segments or at least a construction rule for these URLs (e.g. a segment template in the DASH standard).

DASH segment templates can be used to set a generic URL usable to address or request media segments from alternative representations. This is convenient for generating MPD of compact size as well as for live streaming when the description of the whole presentation cannot be written in advance (i.e. at MPD transmission time).

However, template rules are limited to a set of pre-defined parameters that are resolved from the MPD itself. For the sake of illustration and according to the DASH standard, templates can use the identifier and/or the bandwidth attributes of the representation element. Accordingly, the possible values to build a segment URL are those taken in the different representations declared in the MPD.

U.S. Pat. No.2014/0156865 discloses "generic substitution parameters" in DASH. The main idea is to declare one or more parameters (as elements) in the streaming manifest for which the values can be determined either from the manifest itself or by external means. The possibility to reference a remote element enables resolution of parameter values after having generated a manifest.

This can be useful, for example in case of manifest-based live streaming where characteristics of the content are not known when the manifest is to be generated. According to the disclosed solution, HTTP URLs are defined in the 'href' attribute of an xlink element (xlink is defined by W3C specification: XML Linking Language at http://www.w3.org/TR/xlink11/). Such a HTTP URL references a location outside the manifest. Therefore, the use of Xlink makes possible the resolution of the parameter either when MPD is loaded by a client device or when the element requiring the parameter is selected.

However, although the solution disclosed in U.S. Pat. No. 2014/0156865 may enable determination of the value of a parameter from the manifest itself or by external means, it does not allow dynamic re-evaluation of some parameters external to an MPD.

It is to be noted that an MPD update can be sent if the number of representations changes over time. In such a case, an MPD update comprising possible representations with identifier and bandwidth values usable in a URL template is sent to the client device. However, the MPD update mechanism generally introduces latency and requires client processing (to monitor the moment at which an MPD update should be requested, to parse the MPD update, to compute media selection decisions, etc.).

In view of the preceding, there is a need to improve coding of media presentation description data to make the template mechanism more dynamic so as to avoid the need for MPD updates.

In particular, since the number of detected objects or the number of detected objects that may be considered as an object of interest is generally not known when generating the media presentation description data and/or since this number varies over time, there is a need for enabling dynamic description of objects or of regions of interest in a streamed media presentation.

There is also a need for enabling a client device in a streaming system to track and to focus on objects in a video to address the corresponding media segments for a selected object.

SUMMARY OF THE INVENTION

Faced with these constraints, the inventors provide a device for streaming partitioned timed media data.

It is a broad object of the invention to remedy the shortcomings of the prior art as described above and, in particular, to improve existing adaptive and dynamic HTTP streaming solutions with the dynamic selection of objects associated with regions of interest in a video.

According to a first aspect of the invention there is provided a method for requesting streamed timed media data associated with at least one media item, organized into temporal media segments, the streamed timed media data belonging to partitioned timed media data comprising timed samples, the streamed timed media data being transmitted as media segment files each comprising at least one independently processed component resulting from processing at least one of the timed samples, the method comprising:

receiving a manifest comprising metadata for describing the processed components, the metadata comprising parameters used for describing at least a part of one of the processed components, wherein at least one of the parameters is a dynamic parameter which value can vary over time, the at least one parameter being associated with an element referring to a metadata resource which is external to the manifest and which comprises at least one value defining the at least one parameter;

requesting the streamed timed media data based on metadata of the manifest and of the at least one value defining the at least one parameter.

Accordingly, the method of the invention provides a way to dynamically instantiate manifest parameters that can change over time while keeping compact the size of the corresponding manifest. Such a manifest parameter can be the number of detected objects (typically objects of interest) that can be tracked and streamed in a video sequence. This enables the handling of object appearance and disappearance over a video sequence. The method of the invention can be implemented, at least partially, in a proxy so as to make the dynamic template transparent for standard DASH client devices.

For the sake of illustration, a media item can be a full video, one or more tiles of a video, one or more tracks of an audio, and the like.

In an embodiment, the at least a part of the processed component and the metadata resource are to be obtained by a client device using requests.

In an embodiment, the metadata of the manifest comprise a link enabling generating a dedicated request for obtaining the metadata resource.

In an embodiment, the element referring to the metadata resource further comprises an identifier referencing a part of the metadata of the manifest, enabling identifying the link.

In an embodiment, the identifier is associated with the at least one parameter in the same part of the metadata of the manifest.

In an embodiment, the identifier belongs to a first part of the metadata of the manifest, the at least one parameter belonging to a second part of the metadata of the manifest, distinct from the first part, the identifier enabling establishing a relation between the first and the second parts.

In an embodiment, a request to be used for obtaining the metadata resource comprises a specific header.

In an embodiment, the at least one value defining the at least one parameter is defined in a specific header of a response that conforms to a client/server communication protocol, the response being received in response to the request comprising the specific header.

In an embodiment, each of the processed components resulting from processing at least one of the timed samples is an encapsulated component resulting from encapsulation of at least one of the timed samples.

In an embodiment, the partitioned timed media data are tiled timed media data comprising at least one tile.

In an embodiment, the at least one value defining the at least one parameter defines a set of possible values of the at least one parameter.

In an embodiment, the method further comprises a step of identifying the at least one parameter.

In an embodiment, the at least one parameter comprises an identifier of a media item, the method further comprising a step of selecting at least one item identifier.

In an embodiment, the timed samples of the processed components are identified as a function of the at least one selected item identifier.

In an embodiment, at least two of the parameters are dynamic parameters which values can vary over time, each of the at least two parameters being associated with an element referring to a metadata resource which is external to the manifest and which comprises at least one value defining the corresponding parameter, a value of one of the at least two parameters being dependent on the value of the other one of the at least two parameters.

In an embodiment, at least one current value defining the at least one parameter is determined as a function of at least one previous value defining the at least one parameter.

In an embodiment, the at least one parameter represents width and/or height values of a video frame area.

In an embodiment, the at least one parameter represents a bandwidth of a video sequence.

According to a second aspect of the invention there is provided a method for providing a standard manifest for requesting streamed timed media data associated with at least one media item, organized into temporal media segments, the streamed timed media data belonging to partitioned timed media data comprising timed samples, the streamed timed media data being transmitted as media segment files each comprising at least one independently processed component resulting from processing at least one of the timed samples, the method comprising:

receiving an enhanced manifest comprising metadata for describing the processed components, the metadata comprising parameters used for describing at least a part of one of the processed components, wherein at least one of the parameters is a dynamic parameter which value can vary over time, the at least one parameter being associated with an element referring to a metadata resource which is external to the enhanced manifest and which comprises at least one value defining the at least one parameter;

generating a standard manifest based on metadata of the enhanced manifest and of the at least one value defining the at least one parameter.

Accordingly, the method of the invention provides a way to dynamically instantiate manifest parameters that can change over time while keeping compact the size of the corresponding manifest, while making the dynamic template transparent for standard DASH client devices. Such a manifest parameter can be the number of detected objects (typically objects of interest) that can be tracked and streamed in a video sequence. This enables the handling of object appearance and disappearance over a video sequence.

For the sake of illustration, a media item can be a full video, one or more tiles of a video, one or more tracks of an audio, and the like.

In an embodiment, the at least a part of the processed component and the metadata resource are to be obtained using requests.

In an embodiment, the metadata of the enhanced manifest comprise a link enabling generating a dedicated request for obtaining the metadata resource.

In an embodiment, the element referring to the metadata resource further comprises an identifier referencing a part of the metadata of the enhanced manifest, enabling identifying the link.

In an embodiment, the identifier is associated with the at least one parameter in the same part of the metadata of the enhanced manifest.

In an embodiment, the identifier belongs to a first part of the metadata of the enhanced manifest, the at least one parameter belonging to a second part of the metadata of the enhanced manifest, distinct from the first part, the identifier enabling establishing a relation between the first and the second parts.

In an embodiment, a request to be used for obtaining the metadata resource comprises a specific header.

In an embodiment, the at least one value defining the at least one parameter is defined in a specific header of a response that conforms to a client/server communication protocol, the response being received in response to the request comprising the specific header.

In an embodiment, each of the processed components resulting from processing at least one of the timed samples is an encapsulated component resulting from encapsulation of at least one of the timed samples.

In an embodiment, the partitioned timed media data are tiled timed media data comprising at least one tile.

In an embodiment, the at least one value defining the at least one parameter defines a set of possible values of the at least one parameter.

In an embodiment, the method further comprises a step of identifying the at least one parameter.

In an embodiment, at least two of the parameters are dynamic parameters which values can vary over time, each of the at least two parameters being associated with an element referring to a metadata resource which is external to the enhanced manifest and which comprises at least one value defining the corresponding parameter, a value of one of the at least two parameters being dependent on the value of the other one of the at least two parameters.

In an embodiment, at least one current value defining the at least one parameter is determined as a function of at least one previous value defining the at least one parameter.

In an embodiment, the at least one parameter represents width and/or height values of a video frame area.

In an embodiment, the at least one parameter represents a bandwidth of a video sequence.

According to a third aspect of the invention there is provided a method for providing streamed timed media data associated with at least one media item, organized into temporal media segments, the streamed timed media data belonging to partitioned timed media data comprising timed samples, the streamed timed media data being transmitted as media segment files each comprising at least one independently processed component resulting from processing at least one of the timed samples, the method comprising:

generating and transmitting a manifest comprising metadata for describing the processed components, the metadata comprising parameters used for describing at least a part of one of the processed components,
wherein at least one of the parameters is a dynamic parameter which value can vary over time, the at least one parameter being associated with an element referring to a metadata resource which is external to the enhanced manifest and which comprises at least one value defining the at least one parameter;
transmitting streamed timed media data on a request based on metadata of the manifest and of the at least one value defining the at least one parameter.

Accordingly, the method of the invention provides a way to dynamically instantiate manifest parameters that can change over time while keeping compact the size of the corresponding manifest. Such a manifest parameter can be the number of detected objects (typically objects of interest) that can be tracked and streamed in a video sequence. This enables the handling of object appearance and disappearance over a video sequence. The method of the invention can be implemented, at least partially, in a proxy so as to make the dynamic template transparent for standard DASH client devices.

For the sake of illustration, a media item can be a full video, one or more tiles of a video, one or more tracks of an audio, and the like.

In an embodiment, the at least a part of the processed component and the metadata resource are to be transmitted in response to requests.

In an embodiment, the metadata of the manifest comprise a link enabling generating a dedicated request for obtaining the metadata resource.

In an embodiment, the element referring to the metadata resource further comprises an identifier referencing a part of the metadata of the manifest, enabling identifying the link.

In an embodiment, the identifier is associated with the at least one parameter in the same part of the metadata of the manifest.

In an embodiment, the identifier belongs to a first part of the metadata of the manifest, the at least one parameter belonging to a second part of the metadata of the manifest, distinct from the first part, the identifier enabling establishing a relation between the first and the second parts.

In an embodiment, a request received for transmitting the metadata resource comprises a specific header.

In an embodiment, the at least one value defining the at least one parameter is defined in a specific header of a response that conforms to a client/server communication protocol, the response being transmitted in response to the request comprising the specific header.

In an embodiment, each of the processed components resulting from processing at least one of the timed samples is an encapsulated component resulting from encapsulation of at least one of the timed samples.

In an embodiment, the partitioned timed media data are tiled timed media data comprising at least one tile.

In an embodiment, the at least one value defining the at least one parameter defines a set of possible values of the at least one parameter.

In an embodiment, the method further comprises a step of identifying the at least one parameter.

In an embodiment, the at least one parameter comprises an identifier of a media item, the method further comprising a step of identifying at least one item of interest and a step of determining a number of items of interest.

In an embodiment, the method further comprises a step of receiving at least one selected item identifier, the timed samples of the processed components being identified as a function of the at least one received selected item identifier.

In an embodiment, at least two of the parameters are dynamic parameters which values can vary over time, each of the at least two parameters being associated with an element referring to a metadata resource which is external to the manifest and which comprises at least one value defining the corresponding parameter, a value of one of the at least two parameters being dependent on the value of the other one of the at least two parameters.

In an embodiment, at least one current value defining the at least one parameter is determined as a function of at least one previous value defining the at least one parameter.

In an embodiment, the at least one parameter represents width and/or height values of a video frame area.

In an embodiment, the at least one parameter represents a bandwidth of a video sequence.

According to a fourth aspect of the invention there is provided a device for requesting streamed timed media data associated with at least one media item, organized into temporal media segments, the streamed timed media data belonging to partitioned timed media data comprising timed samples, the streamed timed media data being transmitted as media segment files each comprising at least one independently processed component resulting from processing at least one of the timed samples, the device comprising at least one microprocessor configured for carrying out the steps of:

receiving a manifest comprising metadata for describing the processed components, the metadata comprising parameters used for describing at least a part of one of the processed components,
wherein at least one of the parameters is a dynamic parameter which value can vary over time, the at least one parameter being associated with an element referring to a metadata resource which is external to the manifest and which comprises at least one value defining the at least one parameter;
requesting the streamed timed media data based on metadata of the manifest and of the at least one value defining the at least one parameter.

Accordingly, the device of the invention provides a way to dynamically instantiate manifest parameters that can change over time while keeping compact the size of the corresponding manifest. Such a manifest parameter can be the number of detected objects (typically objects of interest)

that can be tracked and streamed in a video sequence. This enables the handling of object appearance and disappearance over a video sequence.

For the sake of illustration, a media item can be a full video, one or more tiles of a video, one or more tracks of an audio, and the like.

In an embodiment, the at least a part of the processed component and the metadata resource are to be obtained by a client device using requests.

In an embodiment, the metadata of the manifest comprise a link enabling generating a dedicated request for obtaining the metadata resource.

In an embodiment, the element referring to the metadata resource further comprises an identifier referencing a part of the metadata of the manifest, enabling identifying the link.

In an embodiment, the identifier is associated with the at least one parameter in the same part of the metadata of the manifest.

In an embodiment, the identifier belongs to a first part of the metadata of the manifest, the at least one parameter belonging to a second part of the metadata of the manifest, distinct from the first part, the identifier enabling establishing a relation between the first and the second parts.

In an embodiment, a request to be used for obtaining the metadata resource comprises a specific header.

In an embodiment, the at least one value defining the at least one parameter is defined in a specific header of a response that conforms to a client/server communication protocol, the response being received in response to the request comprising the specific header.

In an embodiment, each of the processed components resulting from processing at least one of the timed samples is an encapsulated component resulting from encapsulation of at least one of the timed samples.

In an embodiment, the partitioned timed media data are tiled timed media data comprising at least one tile.

In an embodiment, the at least one value defining the at least one parameter defines a set of possible values of the at least one parameter.

In an embodiment, the microprocessor is further configured for carrying out a step of identifying the at least one parameter.

In an embodiment, the at least one parameter comprises an identifier of a media item, the microprocessor being further configured for carrying out a step of selecting at least one item identifier.

In an embodiment, the timed samples of the processed components are identified as a function of the at least one selected item identifier.

In an embodiment, at least two of the parameters are dynamic parameters which values can vary over time, each of the at least two parameters being associated with an element referring to a metadata resource which is external to the manifest and which comprises at least one value defining the corresponding parameter, a value of one of the at least two parameters being dependent on the value of the other one of the at least two parameters.

In an embodiment, at least one current value defining the at least one parameter is determined as a function of at least one previous value defining the at least one parameter.

In an embodiment, the at least one parameter represents width and/or height values of a video frame area.

In an embodiment, the at least one parameter represents a bandwidth of a video sequence.

According to a fifth aspect of the invention there is provided a video decoder comprising the device described above. The advantages provided by such a video decoder are similar to the ones provided by the device.

According to a sixth aspect of the invention there is provided a proxy for providing a standard manifest for requesting streamed timed media data associated with at least one media item, organized into temporal media segments, the streamed timed media data belonging to partitioned timed media data comprising timed samples, the streamed timed media data being transmitted as media segment files each comprising at least one independently processed component resulting from processing at least one of the timed samples, the proxy comprising at least one microprocessor configured for carrying out the steps of:

receiving an enhanced manifest comprising metadata for describing the processed components, the metadata comprising parameters used for describing at least a part of one of the processed components,
wherein at least one of the parameters is a dynamic parameter which value can vary over time, the at least one parameter being associated with an element referring to a metadata resource which is external to the enhanced manifest and which comprises at least one value defining the at least one parameter;

generating a standard manifest based on metadata of the enhanced manifest and of the at least one value defining the at least one parameter.

Accordingly, the proxy of the invention provides a way to dynamically instantiate manifest parameters that can change over time while keeping compact the size of the corresponding manifest, while making the dynamic template transparent for standard DASH client devices. Such a manifest parameter can be the number of detected objects (typically objects of interest) that can be tracked and streamed in a video sequence. This enables the handling of object appearance and disappearance over a video sequence.

For the sake of illustration, a media item can be a full video, one or more tiles of a video, one or more tracks of an audio, and the like.

In an embodiment, the at least a part of the processed component and the metadata resource are to be obtained using requests.

In an embodiment, the metadata of the enhanced manifest comprise a link enabling generating a dedicated request for obtaining the metadata resource.

In an embodiment, the element referring to the metadata resource further comprises an identifier referencing a part of the metadata of the enhanced manifest, enabling identifying the link.

In an embodiment, the identifier is associated with the at least one parameter in the same part of the metadata of the enhanced manifest.

In an embodiment, the identifier belongs to a first part of the metadata of the enhanced manifest, the at least one parameter belonging to a second part of the metadata of the enhanced manifest, distinct from the first part, the identifier enabling establishing a relation between the first and the second parts.

In an embodiment, a request to be used for obtaining the metadata resource comprises a specific header.

In an embodiment, the at least one value defining the at least one parameter is defined in a specific header of a response that conforms to a client/server communication protocol, the response being received in response to the request comprising the specific header.

In an embodiment, each of the processed components resulting from processing at least one of the timed samples is an encapsulated component resulting from encapsulation of at least one of the timed samples.

In an embodiment, the partitioned timed media data are tiled timed media data comprising at least one tile.

In an embodiment, the at least one value defining the at least one parameter defines a set of possible values of the at least one parameter.

In an embodiment, the microprocessor is further configured for carrying out a step of identifying the at least one parameter.

In an embodiment, at least two of the parameters are dynamic parameters which values can vary over time, each of the at least two parameters being associated with an element referring to a metadata resource which is external to the enhanced manifest and which comprises at least one value defining the corresponding parameter, a value of one of the at least two parameters being dependent on the value of the other one of the at least two parameters.

In an embodiment, at least one current value defining the at least one parameter is determined as a function of at least one previous value defining the at least one parameter.

In an embodiment, the at least one parameter represents width and/or height values of a video frame area.

In an embodiment, the at least one parameter represents a bandwidth of a video sequence.

According to a seventh aspect of the invention there is provided a device for providing streamed timed media data associated with at least one media item, organized into temporal media segments, the streamed timed media data belonging to partitioned timed media data comprising timed samples, the streamed timed media data being transmitted as media segment files each comprising at least one independently processed component resulting from processing at least one of the timed samples, the device comprising at least one microprocessor configured for carrying out the steps of:
generating and transmitting a manifest comprising metadata for describing the processed components, the metadata comprising parameters used for describing at least a part of one of the processed components,
wherein at least one of the parameters is a dynamic parameter which value can vary over time, the at least one parameter being associated with an element referring to a metadata resource which is external to the enhanced manifest and which comprises at least one value defining the at least one parameter;
transmitting streamed timed media data on a request based on metadata of the manifest and of the at least one value defining the at least one parameter.

Accordingly, the device of the invention provides a way to dynamically instantiate manifest parameters that can change over time while keeping compact the size of the corresponding manifest. Such a manifest parameter can be the number of detected objects (typically objects of interest) that can be tracked and streamed in a video sequence. This enables the handling of object appearance and disappearance over a video sequence. The device of the invention can be implemented, at least partially, in a proxy so as to make the dynamic template transparent for standard DASH client devices.

For the sake of illustration, a media item can be a full video, one or more tiles of a video, one or more tracks of an audio, and the like.

In an embodiment, the at least a part of the processed component and the metadata resource are to be transmitted in response to requests.

In an embodiment, the metadata of the manifest comprise a link enabling generating a dedicated request for obtaining the metadata resource.

In an embodiment, the element referring to the metadata resource further comprises an identifier referencing a part of the metadata of the manifest, enabling identifying the link.

In an embodiment, the identifier is associated with the at least one parameter in the same part of the metadata of the manifest.

In an embodiment, the identifier belongs to a first part of the metadata of the manifest, the at least one parameter belonging to a second part of the metadata of the manifest, distinct from the first part, the identifier enabling establishing a relation between the first and the second parts.

In an embodiment, a request received for transmitting the metadata resource comprises a specific header.

In an embodiment, the at least one value defining the at least one parameter is defined in a specific header of a response that conforms to a client/server communication protocol, the response being transmitted in response to the request comprising the specific header.

In an embodiment, each of the processed components resulting from processing at least one of the timed samples is an encapsulated component resulting from encapsulation of at least one of the timed samples.

In an embodiment, the partitioned timed media data are tiled timed media data comprising at least one tile.

In an embodiment, the at least one value defining the at least one parameter defines a set of possible values of the at least one parameter.

In an embodiment, the microprocessor is further configured for carrying out a step of identifying the at least one parameter.

In an embodiment, the at least one parameter comprises an identifier of a media item, the microprocessor being further configured for carrying out a step of identifying at least one item of interest and a step of determining a number of items of interest.

In an embodiment, the microprocessor is further configured for carrying out a step of receiving at least one selected item identifier, the timed samples of the processed components being identified as a function of the at least one received selected item identifier.

In an embodiment, at least two of the parameters are dynamic parameters which values can vary over time, each of the at least two parameters being associated with an element referring to a metadata resource which is external to the manifest and which comprises at least one value defining the corresponding parameter, a value of one of the at least two parameters being dependent on the value of the other one of the at least two parameters.

In an embodiment, at least one current value defining the at least one parameter is determined as a function of at least one previous value defining the at least one parameter.

In an embodiment, the at least one parameter represents width and/or height values of a video frame area.

In an embodiment, the at least one parameter represents a bandwidth of a video sequence.

According to a eighth aspect of the invention there is provided a video encoder comprising the device described above. The advantages provided by such a video encoder are similar to the ones provided by the device.

Since the present invention can be implemented in software, the present invention can be embodied as computer readable code for provision to a programmable apparatus on any suitable carrier medium. A tangible carrier medium may comprise a storage medium such as a floppy disk, a CD- ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIG. 3 illustrates schematically the use of tiles for streaming regions of interest of video sequences;

FIG. 4 illustrates an example of a general user interface that can be implemented, for example, in the client device illustrated in FIG. 1, for object-based streaming;

FIG. 7 is an example of a common media presentation description for describing a set of videos comprising a main video, a corresponding tiled video, and videos associated with objects of interest of the main video;

FIGS. 8a and 8b, illustrate two examples of media presentation descriptions for describing a set of videos comprising a main video, a corresponding tiled video, and videos associated with objects of interest of the main video, comprising one and several dynamic template parameters, respectively;

FIGS. 9a to 9d; FIGS. 9a, 9b and 9c illustrate excerpts of manifest files with dynamic template parameter resolved with metadata stream; FIG. 9d provides an alternative resolution with HTTP Header;

FIG. 10 illustrates a trade-off between statically-set parameters and dynamically-set template parameters for optimizing compactness of manifest;

FIG. 13 is a schematic block diagram of a computing device that can be used for carrying each or some steps of each of the described embodiments of the invention.

Figure 1:
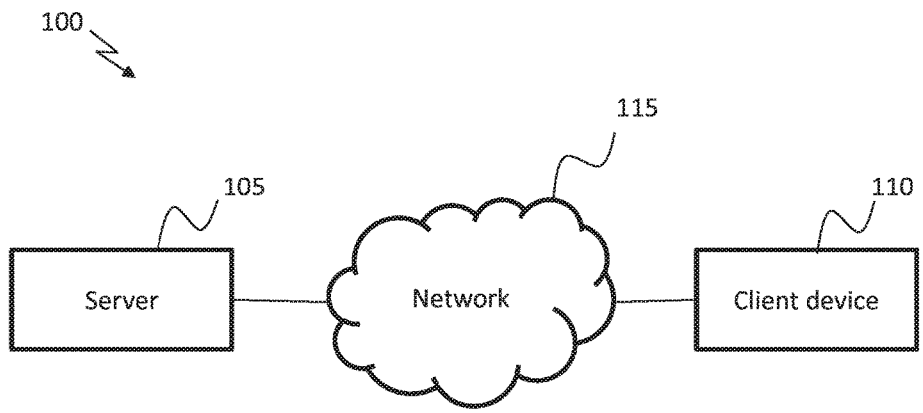
FIG. 1 illustrates an example of an information technology architecture for streaming media data from a server to a client device over a communication network.

DETAILED DESCRIPTION OF EMBODIMENTS
OF THE INVENTION

A general embodiment of the invention is directed to the context of dynamic and adaptive streaming of regions of interest associated with detected objects in compressed video streams, using HTTP and preferably MPEG standard (MPEG/DASH). Regions of interest associated with detected objects mean regions of interest that are not predetermined (i.e. defined in advance), thus providing personalized access to the content.

Coding tools and file format of the HEVC and multi-layer HEVC standard can be used in conjunction with tile coding, making it possible to access tiles selectively on HTTP requests, to encode regions of interest as a set of tiles.

On a general basis and according to a particular embodiment, the solution of the invention makes it possible to declare parameters to be resolved dynamically, that is to say each time the element containing such parameters is selected for a streaming request.

According to a particular embodiment, a specific signalization is used for identifying the parameters that have to be solved dynamically and information is provided to a client device so that the latter can determine how and where to get the data allowing resolution of the dynamic parameters.

According to a particular embodiment of the invention, video sequences are encoded into independent spatial tiles and possibly multiple scalability layers. Each encoded tile is encapsulated in the file format as an independent track. One additional track (reference track) can be used to provide shared data and to describe the composition of several tile tracks at a given scalability layer. The encapsulation is signaled in a manifest to inform the streaming client on the availability of spatial access. The manifest further includes information allowing a client to determine the type of dependencies that exist between media content components (tracks). Thanks to the manifest, a client device can determine the list of media segments to be downloaded for a given Region-of-Interest (ROI).

FIG. 3 illustrates schematically the use of tiles for streaming regions of interest of video sequences.

As illustrated, multiple resolution layers are computed from a high spatial resolution input video 300 comprising a set of images 305-1 to 305-n and each layer is divided into tiles, each tile being encoded independently. In alternative embodiments, tiles may also be encoded with some coding dependencies to other tiles at the same scalability layer or from other lower scalability layers. Similarly to a conventional video stream, a base layer tile may show the whole video scene. In alternative embodiments, the base layer may also be composed of several tiles. When a user wants to zoom into the video, tiles in the higher resolution layers are retrieved to provide higher quality details. Therefore, a client device needs to decode and synchronize multiple tiles for rendering a particular region of interest.

Alternatively, an overlapping tiling scheme can be used so that only one tile is needed to satisfy any region of interest. To handle different display sizes and network conditions, each tile is encoded at different spatial and quality resolutions.

FIG. 4 illustrates an example of a general user interface that can be implemented, for example, in the client device 110 of FIG. 1, for object-based streaming.

Graphical user interface 400 comprises several areas among which text input field 405 that is used to specify a URL of a video description (for example a manifest as illustrated in FIG. 7, 8, or 9) and logical button 410.

When button 410 is pushed down, the client device sends an HTTP request to get the video description (MPD) as defined by the URL entered in text input field 405. After receiving the video description, the latter is analyzed and used to give access to videos and, in particular, to regions of interest associated with detected objects (or objects of interest).

To that end, object selection field 415 is provided in user interface 400.

For the sake of illustration, object selection field 415 comprises an indicator 420 of the fraction shape wherein the numerator represent an identifier of a selected item (1 in the illustrated example), typically an object of interest, and the denominator indicates the number of available items the user can switch to (5 in the illustrated example).

These items can be, for example, objects, views, or videos. Still for the sake of example, these items can represent a video stream associated with each of several objects of interest (e.g. the object represented with references 710 to 730 in FIG. 7).

Accordingly, the numerator designates the current item (e.g. object, view, or video) being streamed and played in video field on screen 425 of user interface 400. Logical buttons 430 and 435 respectively make it possible to increase and to decrease the identifier of the selected item, that is to say the index of the current representation being streamed, when pushed down.

User interface 400 makes it possible for a user to dynamically switch from one object of interest to another.

Figure 5:
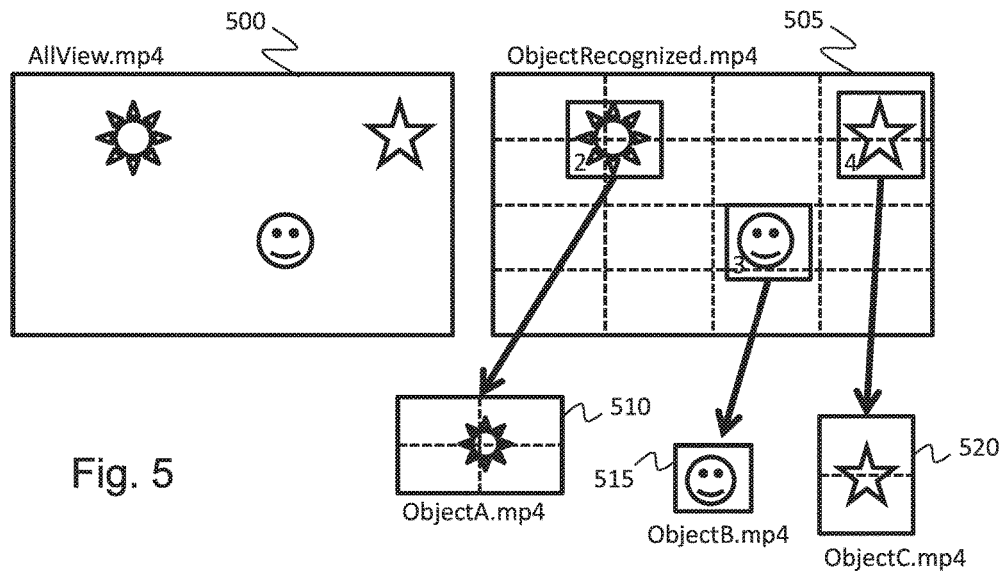
FIG. 5 illustrates an example of video frame comprising several objects of interest.

FIG. 5 illustrates an example of video frame comprising several objects of interest.

As illustrated, main video 500 (Allview.mp4) comprises several objects that can be detected according to a common detection algorithm based on image analysis.

According to a particular embodiment, this main video is duplicated and the duplicate 505 (ObjectRecognized.mp4) is tiled and possibly enhanced so as to reference the detected objects and/or the objects of interest (generally referred to herein after as the objects of interest). If all the objects of interest are logically identified (i.e. located and identified in each video frame), they can be graphically identified on the enhanced main video 505 so that a user can easily select one of them.

A video, more precisely a representation, is then associated with each of the objects of interest. Accordingly, video 510 (ObjectA.mp4) is associated with the object having identifier 2, video 515 (ObjectB.mp4) is associated with the object having identifier 3, and video 515 (ObjectC.mp4) is associated with the object having identifier 4.

According to a particular embodiment, each representation associated with an object of interest corresponds to a set of tiles of the main tiled video.

Figure 6:
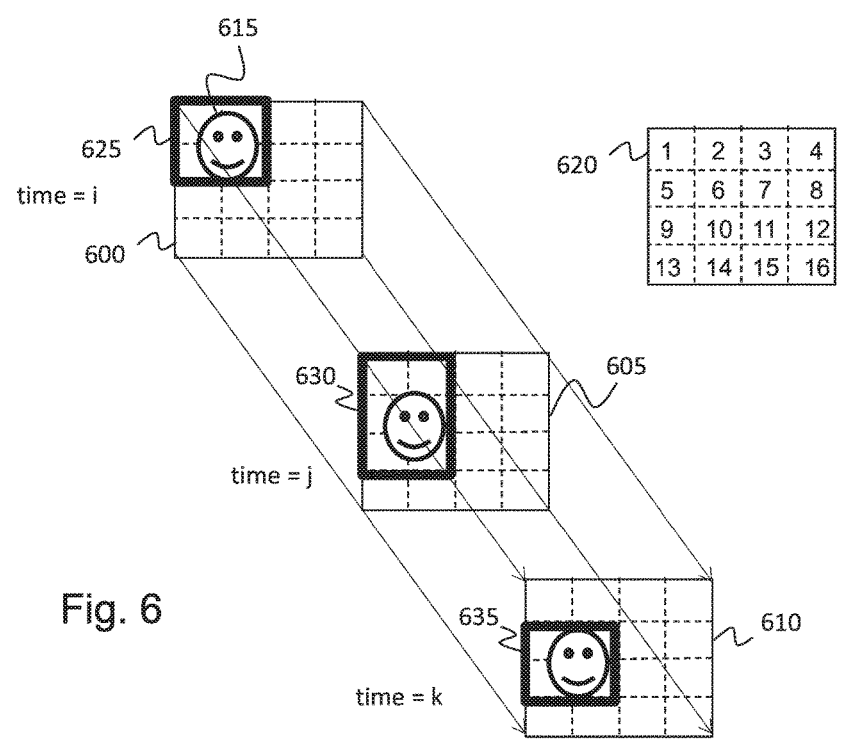
FIG. 6 illustrates an example of a moving object of interest in video frames.

FIG. 6 illustrates an example of a moving object of interest in video frames making it possible to select a temporal pipe of tiles to be displayed.

More precisely, FIG. 6 represents a first video frame 600 of a video sequence, corresponding to time i, a second video frame 605 of the same video sequence, corresponding to time j, and a third video frame 610 still of the same video sequence, corresponding to time k.

As illustrated, each of the video frames 600, 605, and 610 comprises the object of interest 615 that moves from one video frame to another video frame.

Since the video sequence is a tiled video sequence, the part of a video frame comprising an object of interest can be transmitted as a set of tiles.

For the sake of illustration, it is assumed that the video sequence is split into sixteen tiles according to the plan referenced 620. Accordingly, the part of the video frame 600 comprising the object of interest 615 can be transmitted using tiles 1, 2, 5, and 6 as represented with reference 625.

Since the object of interest 615 moved from video frame 600 to video frame 605, the part of the video frame 605 comprising the object of interest 615 cannot be transmitted anymore by using tiles 1, 2, 5, and 6 but can be transmitted using tiles 1, 2, 5, 6, 9, and 10 as represented with reference 630.

Similarly, by reason of the displacement of the object of interest 615 from video frame 605 to video frame 610, the part of the video frame 610 comprising the object of interest 615 does not require the use of tiles 1 and 2. It can be transmitted using tiles 5, 6, 9, and 10 as represented with reference 635.

Accordingly, the region of interest corresponding to object of interest 615 can be displayed (over the sequence starting at time i and ending just before time $_j$) by accessing tiles 1, 2, 5 and 6.

FIG. 7 is an example of a common media presentation description 700 for describing a set of videos comprising a main video, a corresponding tiled video, and videos associated with objects of interest of the main video. In other words, FIG. 7 is an example of MPD with segment templates used to describe detected objects of interest, for example the objects of interest illustrated in FIG. 5.

According to this example, a BaseURL element indicates a client device where all the videos can be retrieved. Then, one or more representations corresponding to each video (i.e. full video 500, tiled full video 505, and the videos 510 to 520 associated with objects of interest) are described in the manifest.

As illustrated with reference 705, a segment template (SegmentTemplate element) can be used when generating the manifest to indicate a client device how to get each media segment. Declaration 705 comprises two template parameters denoted RepresentationID and Number. The RepresentationID parameter is resolved by using one of the Representation@id values that is specified in the manifest while the Number parameter value corresponds to the index of the requested segment, computed for example by current time divided by the segment duration.

As it is apparent from FIG. 7, although a single segment template 705 is used, each object and each version of the video 500 (i.e. full video 500, tiled full video 505, and the videos 510 to 520 associated with the objects of interest) requires the declaration of an adaptation set (AdaptationSet element) and of at least one representation (Representation element).

This results in redundant declarations.

Moreover, each representation has to be declared and a corresponding identifier value (ID attribute) has to be set. This makes media description static and prevents handling appearance and disappearance of objects over time unless using the MPD update mechanism that increases significantly the processing cost at the client device end.

FIG. 8, comprising FIGS. 8a and 8b, illustrates two examples of media presentation descriptions for describing a set of videos comprising a main video, a corresponding tiled video, and videos associated with objects of interest of the main video, comprising one and several dynamic template parameters, respectively.

According to the examples illustrated in FIG. 8, only one "abstract" or "template" of an adaptation set comprising a single representation is declared in the manifest for describing all the videos and the objects of interest, the representation being also declared, if needed, as an "abstract" or a "template".

According to another embodiment (not represented), several adaptation sets can be declared, each comprising one or more representations. For the sake of example, a first adaptation set can be used to declare the full videos (e.g. full video 500 and tiled full video 505 in FIG. 5) and a second adaptation set can be used to declare the videos associated with objects of interest (e.g. videos 510, 515, and 520 in FIG. 5).

In the example of FIG. 8a, the media presentation description 800 comprises the segment template 805 that contains, as the media presentation description 700 of FIG. 7, the two template parameters denoted RepresentationId and Number.

However, as illustrated, the RepresentationId parameter cannot be resolved from the manifest 800 since it is itself declared as a template (reference 810). Therefore, if the manifest 800 is a compact dynamic manifest, its processing requires distinguishing the template parameter 810 from standard DASH template parameters and allowing a client device to get values to resolve this type of template parameter.

This is the same in manifest 815 of FIG. 8b wherein the AdaptationSet parameter and the RepresentationId parameter cannot be resolved from the manifest 815 since they are also declared as templates (references 825 and 830). Again, if the manifest 815 is a compact dynamic manifest, its processing requires distinguishing the template parameters 825 and 830 from standard DASH template parameters and allowing a client device to get values to resolve this type of template parameter.

In other words, the dynamic template parameters conforming the invention differ from the common DASH template parameters in that they are not necessarily resolved from the manifest, in that they may require a client device to issue requests to a server to get the list of admissible values, and in that their values can change over time. It is preferably up to the client to determine at which frequency to request the range of values for a dynamic template parameter. The more frequent it is requested, the more accurate is the description. A trade-off consists in checking periodically whether or not the values of the dynamic template parameters have changed. For sequences with many appearing/disappearing objects, requesting for each segment may be safer. Ideally, a client can auto learn the variations from the content to adapt its requesting rate.

FIGS. 8a and 8b illustrate an example of signalization means for such dynamic template parameters.

It is recalled that according to the DASH standard, DASH template parameters are signaled using the '$' special character before and after the parameter name as illustrated with references 805 and 820 in FIGS. 8a and 8b.

In a similar way, signalization of the dynamic template parameters (e.g.

dynamic template parameters 810, 825, and 830) uses a distinct special character, for example the "!" character, so that client devices can interpret unambiguously this type of template parameter and resolve them dynamically using remote information.

Like DASH template parameters, dynamic template parameters can also be prefixed or suffixed, preferably before and after the enclosing "!" characters.

According to a particular embodiment, signalization of dynamic template parameters conforms a specific format such as the "print" format tag as defined in IEEE 1003.1-2008 following the %0[width]d prototype. The width parameter is an unsigned integer that provides the minimum number of characters to be printed. If the value to be printed is shorter than this number, the result should be padded with zeros. The value is not truncated even if the result is larger.

In contrast to DASH segment templates, there is no parameter identifier and any name can be used for dynamic template parameters.

It is to be noted that signaling dynamic template parameters according to the example of FIG. 8b is closer to the DASH standard signaling than signaling dynamic template parameters according to the example of FIG. 8a is, in that it preserves the standard definition of an adaptation set that stipulates that "all representations contained in one adaptation set represent the same media content components and therefore contain media streams that are considered to be perceptually equivalent".

However, it requires extension of DASH template parameters by giving the possibility to use AdaptationSet@id parameter as a dynamic template parameter. By doing so, it is possible to factorize a presentation description as the one illustrated in FIG. 7 at both adaptation set and representation levels.

For the simplest case where there is one version of a medium per adaptation set, the segment template can be simplified by using two parameters, keeping only RepresentationId and Number parameters, and by setting the adaptation set identifier and the representation identifier (referenced 825 and 830 in FIG. 8b) to the same dynamic template parameter, for example: "!ObjectID!".

If multiple versions of a medium are available, two dynamic template parameters are required as illustrated in FIG. 8b. The resolution should then be a multi-level resolution as explained herein after.

Since nothing in the DASH standard prevents declaration of all the objects in the same adaptation set provided that the corresponding representations have identical values for all the following media component properties (i.e. role, viewpoint, accessibility, rating, content type, picture aspect ratio and language), it is possible to use only one adaptation set and to represent each object by one corresponding representation inside this unique adaptation set as illustrated in FIG. 8a. This description, using only dynamic template parameters for identifying the representations provides a compact description.

While the template mechanism of the DASH standard defines substitution rules for each template parameter identifier, means to inform a client on how to get information for admissible values for dynamic template parameters are needed.

According to a particular embodiment, resolution of dynamic template parameters uses a metadata stream as depicted in FIG. 9a.

For the sake of illustration, the MPD 900 relates to a video representation 905 whose segments can be obtained as a function of the URL template declared in the SegmentTemplate element 910.

As one can observe, the RepresentationID parameter cannot be resolved directly since the Representation@id is a dynamic template parameter as shown with reference 915.

As illustrated in FIG. 9a, representation 905 is further defined by another representation that is associated with representation 905 with the associationId attribute 920.

It is to be noted that in order to improve clarity and avoid ambiguity, an optional associationType element can be declared in representation 905 to indicate that the representation referenced by the associationId attribute is a dynamic template resolution track. Such an associationType attribute may consist, for example, in a unique four character code (ex: @associationType='dtpr'). Adding a specific association type is particularly useful when one representation has multiple associations to other representations.

Alternatively, as illustrated in FIG. 9c, the associationId and associationType attributes can be declared in the metadata representation either with the same explicit four character code or with the "content description" four character code "cdsc" as defined in ISO-14496-12, so as to provide a bi-directional association between a representation and a referenced representation.

In the example illustrated in excerpt 970 of FIG. 9c, the bandwidth attribute 974 of the video representation 971 is set as a dynamic template parameter.

This can prove to be useful for a streaming client that may determine the exact bandwidth value of a given time segment so as to determine a fine grain bandwidth adaption.

According to the given example, the video representation has a unique identifier 973. This identifier is used in the metadata representation for dynamic template parameter resolution by declaring an association between the video representation and the associationId attribute 976. This association is qualified with the associationType attribute 977 to indicate a dynamic template parameter resolution relationship.

It is to be observed that according to the embodiments of FIG. 9a and of FIG. 9b (described herein below), an MPD parser directly identifies the relation between a video representation and a corresponding metadata representation ('Rm'). On the contrary, according to the embodiment of FIG. 9c, the parser can determine this relation only after having parsed the whole MPD (or at least the metadata representation to which is related the video representation), especially the metadata representation 975 that indicates a posteriori that the video representation has descriptive metadata in another representation.

Returning to FIG. 9a, the associationId element indicates that representation 905 is related to the representation having the identifier id="Rm" (i.e. the representation referenced 925).

As illustrated, the parent AdaptationSet element for this representation indicates that it belongs to a metadata stream (<AdaptationSet contentType='text' codec='mett'>). To access metadata segments, a client device can use the URL template (also called a link) given by Segment Template element 930. It is to be noted that this URL template can be solved from MPD 900 since the RepresentationId element of the Segment Template element 930 can only take the value "Rm" (only the segment index varies and its values replace the Number template parameter).

According to the particular example illustrated by reference to FIG. 9a, a metadata segment would specify the one or more ranges of values for the dynamic template parameters, in particular for the objectID dynamic template parameter.

For the sake of illustration, such a range of values can be expressed as follows in a metadata segment:
ObjectID:1-5
when only values between 1 and 5 (included) are allowed or
ObjectID:1-3; 5
when, for example the object with ID=4 is not allowed (e.g. no more present in the sequence).

The syntax for metadata text defining some parameter values could be expressed, for example in ABNF grammar as specified in RFC 5234:
Parameter=parameter_name ":" 1*[parameter_value/parameter_range] CRLF
parameter_name=ALPHA*(ALPHA/DIGIT/"-")
parameter_value=1*DIGIT
parameter_range=first value "-" last_value
first_value=1*DIGIT
last_value=1*DIGIT The ';' character is used as a separator between multiple parameter_range parameters or between parameter_value and parameter_range parameters.

According to a particular embodiment, the encoding module used to encode the video to be streamed is configured for generating several versions of the same video, for example several versions of the same video associated with one object of interest.

This can be respectively scalable versions or independent versions depending on whether the server embeds one single encoder or multiple encoders. When a manifest is generated, the server should describe each alternative version.

According to a particular implementation, the manifest looks like the excerpt 950 of FIG. 9b.

As illustrated, the manifest comprises two types of media, the video denoted 951 and the descriptive metadata 955. According to the given example, the various video representations are accessible through the URL template 952. To enable a client device to dynamically adapt the transmission as a function of transmission parameters, there are multiple representations per adaptation set.

In accordance with the previous embodiment, the representations may correspond to the videos described by reference to FIG. 5 being observed that it is possible to use several adaptation sets (e.g. one for the full video representations and one for the objects of interest).

As illustrated, the URL template relies on RepresentationID parameter and, by looking at representation definitions, it appears that the Representation@id parameter is a dynamic template parameter. The Representation@associationId parameter indicates that the dynamic parameter can be resolved by a client device with metadata information, i.e. the representation identified with "Rm" value.

For the sake of illustration, each of the video representations contains two dynamic template parameters denoted 953 and 954 corresponding to the identifier and bandwidth attributes, respectively. It is to be noted that other attributes can be templated.

Accordingly, the metadata segments should provide these two values. According to the illustrated example, the range of values for the object identifiers is the same across the representation elements while the values for the bandwidth vary from one representation to another according to the encoding parameters. This requires a multi-level resolution of the dynamic template parameters.

In such a case, the metadata segments should provide the range of values of the object identifiers (ObjectID dynamic template parameter 953) and the bandwidth values (ObjectBW dynamic template parameter 954) corresponding to each version of each video (i.e. the full videos and the videos for the objects of interest).

Therefore, each metadata segment should list the possible values for the dynamic template parameters, for each video (i.e. the full videos and the videos for the objects of interest).

According to the example illustrated in FIG. 5, a metadata segment would then look like:
ObjectID=1-5
/to indicate the number of possible values for ObjectID parameter/
ObjectID=1:{ObjectBW=1000000 2000000}
/to indicate the possible values for the bandwidth parameter in each version for the full video 500/
ObjectID=2:{ObjectBW=1010000 2015000}
/to indicate the possible values for the bandwidth parameter in each version for the tiled full video 505/
ObjectID=3:{ObjectBW=250000 500000}

/to indicate the possible values for the bandwidth parameter in each version for the video 510 associated with object A/
ObjectID=4:{ObjectBW=125000 250000}
/to indicate the possible values for the bandwidth parameter in each version for the video 510 associated with object B/
ObjectID=5:{ObjectBW=200000 350000}
/to indicate the possible values for the bandwidth parameter in each version for the video 510 associated with object C/

In such an embodiment, the decision regarding the representation to select and the segments to download is computed after resolution of the dynamic template parameters as described herein below.

It is to be noted that a similar process can be used to handle a manifest such as the one illustrated in FIG. 8*b* wherein the number of adaptation sets is to be provided to resolve the AS_ID parameter. A first level aims at providing the range of usable AdaptationSet@id values and a second level aims at providing the range of usable Representation@Id values for each AdaptationSet@id value.

If the case arises, for example if the values of dynamically template representation's attributes have to be recovered, a third level is used so as to provide the possible values for the attributes for each representation of each adaptation set.

It is to be noted that the complexity of the metadata stream increases with the number of required levels which may lead to choose an embodiment such as the one described by reference to FIG. 8*a* or one of the alternative solutions described herein below.

It is also to be noted that in a proprietary system with a stateful server, the metadata segments can be incremental to limit the amount of information exchanged between a client device and the server. For example, if the parameters for the five objects described by reference to FIG. 5 (full video, tiled full video, and the video associated with each object of interest) do not change and if no object appears or disappears, an empty segment (or a specific text like "no change" or an integer value (e.g. 0) or the like) can be sent to indicate that the object configuration and description remain the same. In case an object appears, only the range of the object identifiers (ObjectID parameter value range) is to be updated and the parameters for this new object have also to be set in the metadata segment.

Still in a particular embodiment, the metadata segments can be placed in mp4 boxes, when the videos are encapsulated in mp4 file format, for example free boxes (since the above metadata format is not standard). The metadata segments can also be placed under a 'meta' box as an item of information entries ('infe') with item_type set to 'MIME' or to a reserved four character code indicating dynamic template resolution information (ex: 'dtpr'). The content-type for these information items indicates a text media type and a reference to the location, for example with an ItemLocationBox, in the mdat box where the metadata would be stored. Optionally, the item_name parameter of the information item can contain the name of the dynamic template parameter for which metadata provide the list of possible values (e.g., turning to FIG. 9*a*, item_name="ObjectID").

Other embodiments such as the following exist to provide standard and interoperable metadata:

defining a new scheme_id_uri for the DASH Event message box ('emsg') and storing the metadata in the message data part of this box. A possible value can be the value "urn:mpeg:dash:event:dyntemplate:2014" or any unique identifier unambiguously indicating an event related to dynamic parameter resolution. An expiration date is preferably provided to inform a client device that more updates are possible;

allocating one or more values to the InbandEventStream@value parameter and keeping the scheme_id_uri parameter set to the value "urn:mpeg:dash:event:2012". For the sake of illustration, a value equal to 3 indicates that the message_data part of the message box emsg contains the range of values for the ObjectID parameter, a value equal to 4 indicates that the message_data part contains the range of values for the ObjectID parameter and, for each value of the objectID parameter, a list of values for other template attributes (as described above); and using a sequence of EventStream events in a period level with a registered uniform resource name (URN) to indicate dynamic template resolution and putting the parameter_definition definition as a string between the event start and end tags after an xlink resolution.

This would benefit from the event mechanism natively provided by the DASH standard according to which an event of the InbandEventStream type can be declared in the representations with dynamic template parameters or according to which a sequence of Event elements can be declared in a period declaration.

To make sure that the parameters are dynamically resolved, the xlink mechanism can be used in Event declaration or in InBandEventStream declaration to differ the resolution. To allow variability of the parameters over time, it is however necessary to have either a specific xlink:show attribute value to indicate that content should be embedded but without removing the xlink element or for the server to generate a content itself including an xlink element to use for the next evaluation of the dynamic template parameters.

Still according to a particular embodiment, approximate values are generated when handling several versions of each video so as to avoid making the metadata segments too complex. According to this embodiment, the server pre-generates approximate values for the mandatory representation's bandwidth attribute by using nested tiling as illustrated with references 1000 and 1005 in FIG. 10.

FIG. 10 illustrates a trade-off between statically-set parameters and dynamically-set template parameters for optimizing compactness of manifest.

As illustrated, each tile of the tiled video 1000 is split into four tiles in the tiled video 1005, the one tile of the tiled video 1000 and the four tiles of the tiled video 1005 covering the same frame area. According to the illustrated example, all of the tiles share the same resolution.

Such an arrangement makes it possible for the server, using SNR scalability, to provide a low quality version of the video (reference 1000) or a better video quality (reference 1005).

Regarding the description of the video, the server generates a compact manifest using a dynamic template parameter for the object selection in each alternate representation, as illustrated on the manifest excerpt 1010.

Since the bandwidth parameter is mandatory in a DASH manifest, the specification of the @bandwidth parameter value is an issue in each switchable representation (since it can be a criterion for a client device to select the most appropriate object version).

In order to keep manifest compact and metadata for dynamic template resolution simple, a solution consists in tiling the video so that each of the object of interest can be represented by one tile and in using the maximum bandwidth of the tiles at a given level.

For example, by considering video 1000, the bandwidth of the most costly tile is given to each object's representation to be sure that a client device can download the corresponding representation in time. For the highest quality, the tiling is finer (the size (W2×H2) of tiles of the video 1005 is the same as the size (W1×H1) of the tiles of the video 1000) but the same spatial area is addressed per object as in low quality.

Therefore, the server can reuse the maximum bandwidth for the sets of tiles in the video 1005, for the corresponding representation, and declare its value in the manifest without need for using a dynamic template parameter for declaring the bandwidth. This also allows indication of the object sizes in multiple of tile sizes in the manifest, as shown in the excerpt 1010 of manifest. For example, assuming that the most complex tile of video 1005 (out of the sixteen) requires a bandwidth lower than or equal to 500 kbits/sec, the bandwidth parameter's value of each representation describing one of the three objects of video 1005 can take the value 2000 kbits/s, corresponding to four tiles each requiring 500 kbits/s.

As a consequence, in view of the different configurations and embodiments described herein above, the server has different description and sending strategies leading to a predetermined trade-off between the complexity and the precision:

- sending a fixed number of tiles with pre-determined bandwidth as described by reference to FIG. 10 making it possible to require only one dynamic template parameter for describing the number of objects (the bandwidth, width and height being statically resolved and set by server). According to the example illustrated in FIG. 10, the video associated with any object of interest is sent as one tile for low resolution and as 4 tiles for high resolution;
- sending the smallest number of tiles with pre-determined bandwidth (the bandwidth being predetermined by over-estimation, i.e. max bounding). Such a solution is a variant of the one described by reference to FIG. 10 wherein only one dynamic template parameter is used for describing width and height. In reference to the example of FIG. 10, each video associated with an object of interest is sent as one tile in low resolution and as four tiles for object 2, two tiles for object 4 and one tile for object 3 for high resolution; and
- send the smallest number of tiles with corresponding bandwidth. In such a case, two dynamic template parameters are used for describing bandwidth and width and height parameters (@bandwidth, @width, @height), as described in reference to FIG. 9*b*.

Figure 11A:
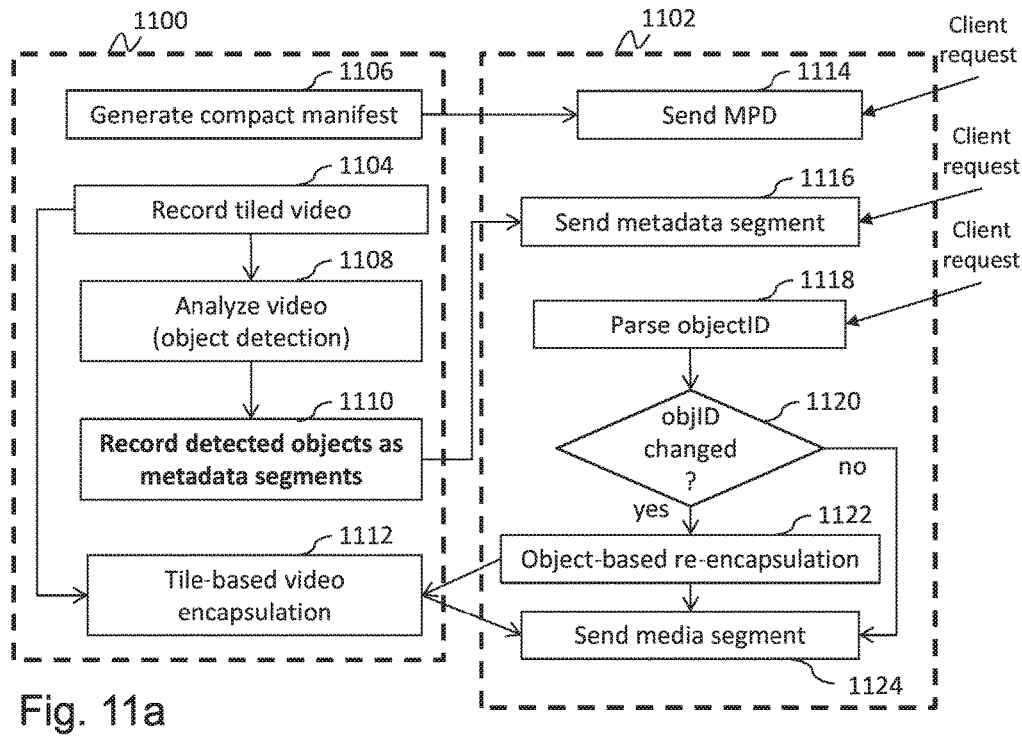
FIGS. 11a and 11b, illustrate example of steps that are carried out in a server and in a client device, respectively, for implementing embodiments of the invention.
Figure 11B:
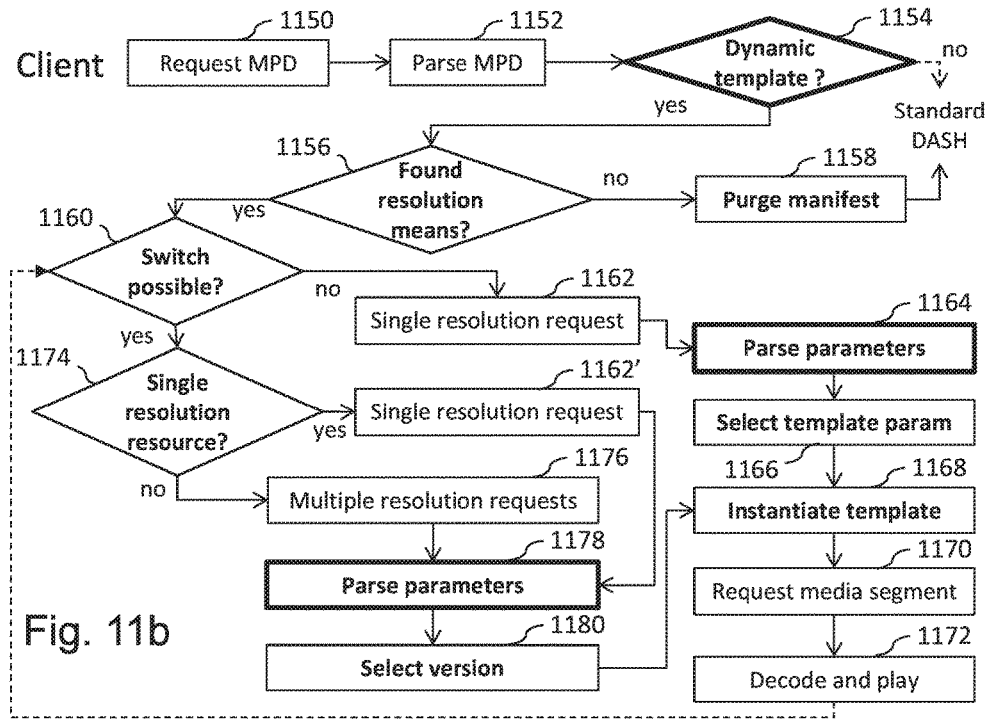

FIG. 11, comprising FIGS. 11*a* and 11*b*, illustrates example of steps that are carried out in a server and in a client device, respectively, for implementing embodiments of the invention.

Figure 2:
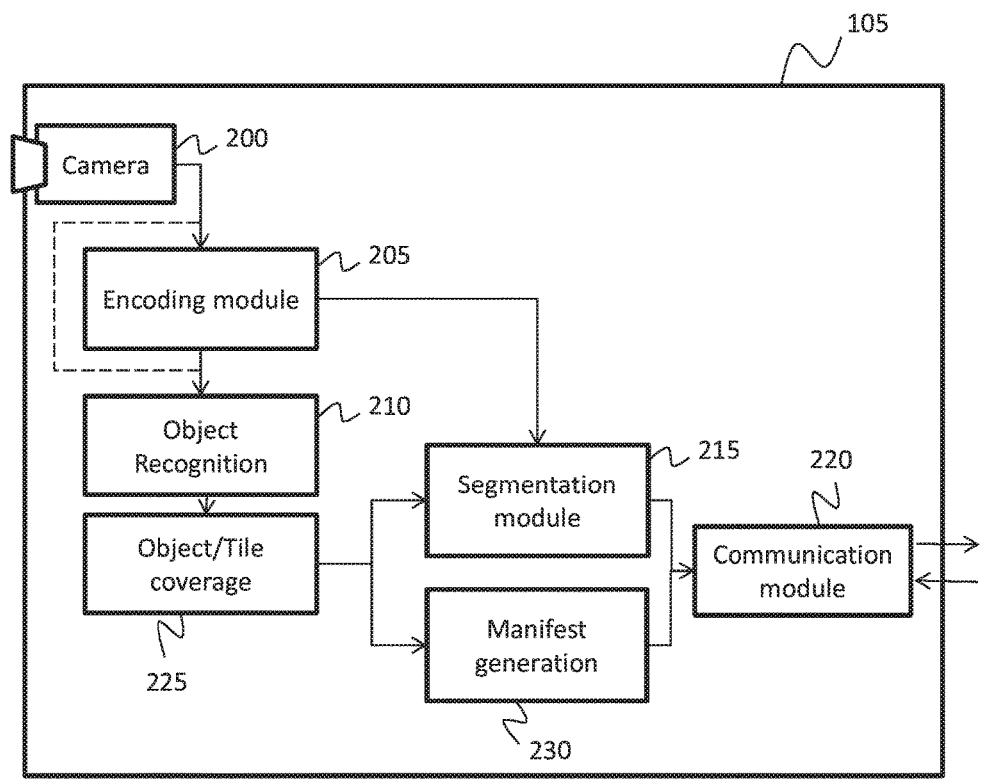
FIG. 2 illustrates modules of a server, for example of the server illustrated in FIG. 1 that is configured for providing a video stream.

As illustrated in FIG. 11*a*, the steps that are carried out by the server, for example server 105 of FIGS. 1 and 2, mainly comprise two different tasks, one being directed to recording and preparing a video for streaming (reference 1100) and the other one being directed to processing the requests from a streaming client device (reference 1102).

Regarding the first task (reference 1100), the represented steps mainly correspond to the main modules described by reference to FIG. 2. Accordingly, the camera 200 records a video sequence that is encoded within encoding module 205 during recording step 1104. According to a particular embodiment, video recording step 1104 comprises a tiled video encoding step resulting in an HEVC bitstream comprising tiles.

Simultaneously or not, the server generates a compact manifest, typically a MPD, during step 1106. Given the characteristics of the server and the encoding configuration, the server generates one compact manifest comprising dynamic template parameters for the whole sequence.

Next, the video is analyzed by the object recognition module 210 during step 1108 to determine, in particular, how many objects of interest are currently represented in the video frame and, for each detected objet of interest, their location in the video frames (the location being typically expressed as a function of tile identifiers). The results are stored as metadata segments by the server during step 1110.

In a parallel step or in a following step, the server generates a tile-based encapsulation during step 1112 where each tile is stored in its own track in segments, for example in mp4 segments.

Accordingly, the encapsulation can consist in packaging segments into the ISO Base Media File Format. However, it is to be noted that the segments can be packaged according to another file format. In such a case, step 1112 mainly consists in processing the data to map them into a container format, for example WebM, or to packetize the data into a format suitable for their transport (e.g. MPEG-2 Transport Stream) on the network, that is to say providing, in particular, type and timing information.

Regarding the second task (1102) that is directed to receiving and processing client requests, a first step (step 1114) aims at providing a compact manifest to a client device in response to a request, it being recalled that, at the beginning of a streaming session, a client device requests a streaming manifest. The transmitted manifest is typically a manifest generated during step 1106.

Next, during streaming, when the client device asks for metadata helping for dynamic template parameter resolution, the server builds metadata segments on the fly and sends them to the client device during step 1116. As described above, the metadata segments contain information sections that depend on the encoding configuration and adaptation/switching possibilities.

Similarly, during streaming, when the client device requests media segments corresponding to a selected object of interest, a first step aims at identifying the requested objet (step 1118). If the requested object is different than the previous requested object (step 1120), a new object encapsulation step is carried out (step 1122) by picking in the tile tracks built during 1112 the set of tiles corresponding to the location of the requested object (information provided by module 225) with their samples corresponding to the requested segment.

Next, the media segments are sent to the client device during step 1124.

As mentioned above and as illustrated in FIG. 11*b*, a first step for a streaming client device is directed to requesting a streaming manifest (step 1150).

After reception of a manifest, the latter is parsed to build in memory a representation of the media presentation (step 1152).

For the sake of illustration, it is considered that the parsed manifest is a compact manifest comprising one or more URL templates as described by reference to FIGS. 9*a* and 9*b* where the URL template(s) reference one dynamic template parameter (e.g. the ObjectID parameter).

During parsing of the manifest, the client device checks whether or not dynamic template parameters are present in the manifest (step 1154). As described previously in reference to a particular embodiment, this can be easily detected by the use of particular characters. For example, the presence of a dynamic template parameter can be detected by identifying an attribute value enclosed within the "!" characters.

If the manifest does not comprise any dynamic template parameter, it is processed on a standard DASH basis.

On the contrary, if the manifest comprises one or several dynamic template parameters, a next step aims at determining whether or not the manifest comprises resolution means for the identified dynamic template parameters (step 1156). As described above with reference to FIG. 9, resolution means may comprise a metadata stream of which the association is described using 'dptr' or 'cdsc' attributes.

If no resolution means is provided in the manifest, the client device purges the manifest in step 1158 to withdraw the elements containing dynamic template parameters so as to process the manifest on a standard DASH basis with remaining media components (if any).

Alternately, in a preferred embodiment, when the streaming client does not identify any resolution means in step 1158 (as illustrated with reference 980 in FIG. 9*d* where no metadata stream description is declared in the manifest), it activates an HTTP header generation module (not represented on FIGS. 11*a* and 11*b*) so that when requesting initialization data right after the download of the manifest, it can add to the simple request on media segments an HTTP header specifying the name of a dynamic template parameter to resolve.

In return, the server embedding the invention interprets this header and, in the response to the request for the media segments, it provides a symmetric HTTP header comprising the list of values for the requested dynamic template parameter. The couple of HTTP headers can be, for example, those described by reference to FIG. 10.

This embodiment also allows a client device to control the update frequency of the dynamic template parameter values. Indeed, it can decide to put this specific header when requesting (at time t) a media segment to get the values for the dynamic template parameters for the next segment (starting at time t+the segment duration). To get information on many dynamic template parameters, it can issue several HTTP headers, one per dynamic template parameter or use another HTTP header accepting as arguments a list of values, the values being the list of dynamic template parameters names.

Here is an example of request from a client device to a server:
GET http://server.com/Representation1-0.mp4
. . .
DASH-Template-Request: ObjectID
and here is an example of a corresponding response from the server to the client device:
200 OK
. . .
DASH-Template-Values: 1-5
    (indicating the acceptable range of values)
Content-Length=1234
    (followed by the 1234 bytes of data for the requested mp4 segment)

For example, by considering a manifest declaring two adaptation sets (one for the full video without any dynamic template parameter and one for the template objects with dynamic template parameters), a client that would not support the dynamic templates or that could not resolve these dynamic template parameters would remove any representation having segments URL depending on dynamic template parameters from the adaptation set. If no representation remains in this adaptation set, then the full adaptation set is removed from the MPD.

On the contrary, if resolution means are provided in the manifest, a following step aims at checking whether there exist alternative representations for dynamic switching (step 1160), as described by reference to FIG. 9*b*.

If there is only one representation using a dynamic template parameter, the client issues a request to resolve the dynamic template parameter at step 1162 (for the case described by reference to FIG. 9*a*, it is a request for the current metadata segment).

Next, the metadata segment received from the server in response to the request is parsed in step 1164 to extract the dynamic template parameter values among several possible values, for example the range of values for the ObjectID parameter in the example illustrated in FIG. 9*a*. Then, at step 1166, a value is selected in the possible range to instantiate the URL template during step 1168. Once the URL has been formed, the client device can issue a request for the current media segment during step 1170. When received, the media segment is decoded and played during step 1172.

As illustrated with dotted line arrow, steps 1160 to 1172 are repeated until the end of the presentation.

If there exist alternative representations for dynamic switching (step 1160), i.e. if test 1160 indicates switching possibilities in the manifest, the client device checks during step 1174 whether there are multiple resources for the resolution of the dynamic template parameters (corresponding to the example illustrated in FIG. 9*b* where one metadata representation is associated with each video representation) or only one.

If there exist multiple metadata representations, the client issues as many requests as metadata representations to resolve all the dynamic template parameters of the alternative representations (step 1176). On the contrary, if there is only one external resource for parameter resolution, the client issues the corresponding request during step 1162' (which is similar to step 1162).

Next, the dynamic template parameters are resolved during step 1178 to make it possible to select the appropriate version of the video or object during step 1180. Indeed, if parameters other than the identifier are provided through an external resource (for example bandwidth as described by reference to FIG. 9*b*), the client device can use this information for its adaptation logic during step 1180.

Once the version has been selected as well as an object or video (like in step 1166), the URL template can be instantiated (step 1168), media segments can be requested (step 1170) and received media segments can be played (step 1172).

Using the user interface described by reference to FIG. 4, it is assumed that, by default, a client device starts with displaying a full video (for example, using the value ObjectID=1) and when it gets information on the number of objects through indicator 420, a user can start switching the display of a region of interest to another by switching from an object to another using buttons 430 and 435.

According to a particular embodiment, it is up to the client device to do an update request on parameter values or not providing a trade-off between reactiveness to content change and transmission plus processing cost. If a client chooses a low metadata update frequency, there are risks for object disappearance between two metadata requests. In such a case, the server can send the full video when an object that is no more available is selected, instead of returning an error.

In order to provide an explicit indication of an identifier for each object of interest, a DASH descriptor can be added in the manifest for example as a <SupplementalProperty> descriptor at the AdaptationSet level (for example <SupplementalProperty schemeIdUri="um:mpeg:dash:sai:2014" value=!ObjectID!/>). This enables the content generator or the media server to annotate each of the objects with an identifier that is consistent along the full duration of the video, so that although objects may appear and/or disappear, the same object has its own identifier independently of the number of objects. Any descriptor element (for example a role element, a new element or an existing descriptor with a new scheme identifier) or any attribute dedicated to the identification of a piece or an object of the video can be used here.

Figure 12:
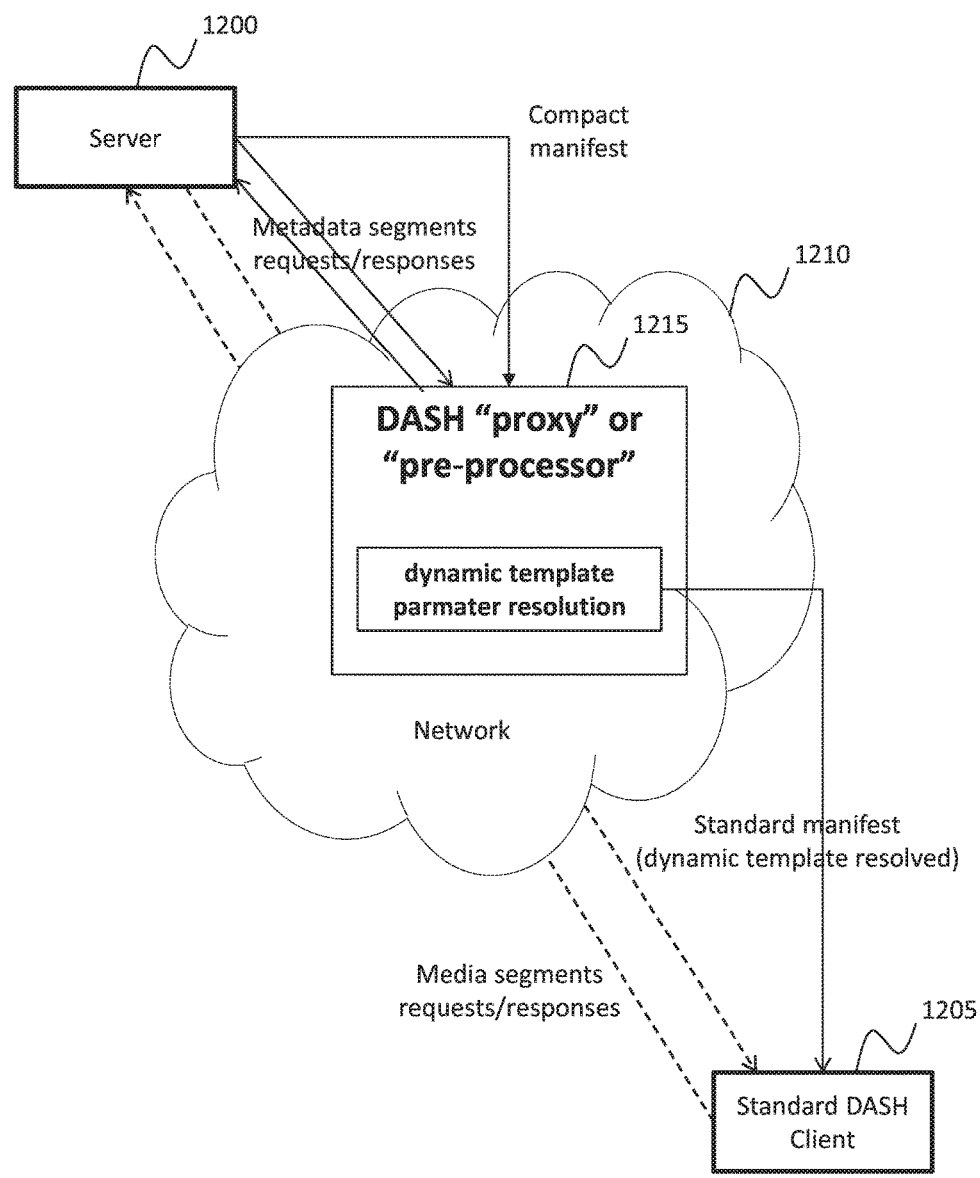
FIG. 12 illustrates an example of proxy-based dynamic template parameter resolution.

In order to be used within standard client devices, a proxy can take in charge the dynamic template parameter resolution (instead of the client) as illustrated in FIG. 12.

For the sake of illustration, the server 1200 and the client device 1205 are connected through a communication network 1210 comprising proxy 1215 configured to carry out steps of the method of the invention.

According to this particular embodiment, the server and the proxy exchange a compact manifest, for example a compact manifest similar to the ones illustrated in FIGS. 9a and 9b, that is to say a manifest that contains one or more dynamic template parameters, also referred to as an enhanced manifest.

During a streaming session, the proxy 1215 is in charge of resolving the dynamic template parameters so as to provide a standard manifest to the client 1205, for example a manifest complying to DASH standard. This can be done in a way similar to the one followed by a client device as described herein above.

To that end, the proxy regularly requests the metadata segments to the server in order to know the possible values for the dynamic template parameters.

According to a particular embodiment, if both the server and the proxy support a push capable protocol (e.g. HTTP/2 or WebSocket), the transmission of one or several metadata segments can be done according to that push mode. This presents advantages, in particular in terms of latency and for updating information, since the server knows when an object appears or disappears and thus, when the possible range of values for dynamic parameters also changes. Accordingly, this mode makes the streaming very reactive. When these values change, the proxy informs the client by providing an update of the manifest following standard manifest update mechanism, for example as a new Period element in DASH.

According to another embodiment, HTTP headers are used to inform the proxy on dynamic template parameter values without issuing a specific HTTP request to get the dynamic template parameter's values. For example, when requesting a media segment with a HTTP GET request, the proxy can also indicate in a specific HTTP header that it would like to obtain the current number of objects of interest. An example of HTTP header can be the following: "DASH-Template-Request: ObjectID".

A server receiving an HTTP request with this header interprets it as a request on the possible range of values for the dynamic template parameter "ObjectID".

It then replies with a HTTP response having a corresponding specific HTTP header. This corresponding specific HTTP header comprises the range of values of the dynamic template parameter.

For the sake of illustration, in response to the previous GET request from the proxy, the server includes the following specific HTTP header in its HTTP response: "DASH-Template-Values: 1-5". This HTTP header informs the proxy that ObjectID can take any integer value in the interval [1, 5]. The same header with value "DASH-Template-Values: 1;3-5" indicates that ObjectID can take any integer value in [1, 5] except the value 2. This embodiment is not limited to server-proxy communication and can also be used between clients and server.

More generally, the DASH-Template-Request HTTP header (or any HTTP header dedicated to the resolution of the dynamic template parameters) can take a list of comma-separated parameters to resolve. In response, the DASH-Template-Values header (or any HTTP header dedicated to the transmission of the values of the dynamic template parameters) can take a string value matching the ABNF grammar referred to in a previous embodiment to provide values through metadata segments.

In the case of a DASH manifest, this can be done by the proxy by setting the MPD type as "dynamic" and fixing the minimum MPD update time to several seconds (this duration can be adjusted over time by the proxy if monitoring the appearance/disappearance of objects over time) or by using the DASH validity expiration point in an 'emsg' (event message) box. It may occur that before an MPD update, the client requests a media segment for an object that has disappeared. In such case, the server can, instead of returning an error, reply with the full video in order to keep the streaming session running.

FIG. 13 is a schematic block diagram of a computing device 1300 that can be used for carrying out each or some steps of each of the described embodiments of the invention. Computing device 1300 may be a device such as a microcomputer, a workstation, or a light portable device.

Computing device 1300 comprises a communication bus connected to:
- a central processing unit 1305, such as a microprocessor, denoted CPU;
- a random access memory 1310, denoted RAM, for storing the executable code of the method of embodiments of the invention as well as registers adapted to record variables and parameters necessary for implementing the method for reading and writing the manifests and/or for encoding the video and/or for reading or generating data under a given file format, the memory capacity thereof can be expanded by an optional RAM connected to an expansion port for example;
- a read only memory 1315, denoted ROM, for storing computer programs for implementing embodiments of the invention;
- a network interface 1320 is typically connected to a communication network over which digital data to be processed are transmitted or received. The network interface 1320 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1305;
- a user interface 1325 for receiving inputs from a user or to display information to a user;
- a hard-disk 1330 denoted HD; and
- an I/O module 1335 for receiving/sending data from/to external devices such as a video source or display.

The executable code may be stored either in read only memory 1315, on the hard-disk 1330, or on a removable digital medium such as for example a disk. According to a variant, the executable code of the programs can be received by means of a communication network, via the network interface 1320, in order to be stored in one of the storage means of the communication device 1300, such as the hard disk 1330, before being executed.

The central processing unit 1305 is adapted to control and direct the execution of the instructions or portions of software code of the program or programs according to embodiments of the invention, which instructions are stored in one of the aforementioned storage means. After powering on, the CPU 1305 is capable of executing instructions from main RAM memory 1310 relating to a software application after those instructions have been loaded from the program ROM 1315 or the hard-disk 1330 for example. Such a software application, when executed by the CPU 1305, causes steps of the algorithms described previously to be performed.

In this embodiment, the apparatus is a programmable apparatus which uses software to implement the invention. However, alternatively, embodiments of the present invention may be implemented in hardware (for example, in the form of an Application Specific Integrated Circuit or ASIC).

Embodiments of the invention may be embedded in a device such as a camera, a smartphone, or a tablet that acts as a remote controller for a TV, for example to zoom into a particular region of interest. They can also be used from the same devices to have personalized browsing experience of a TV program by selecting specific areas of interest. Another usage of these devices by a user is to share selected sub-parts of his/her preferred videos with other connected devices. They can also be used in smartphone or tablet to monitor what happens in a specific area of a building put under surveillance provided that the surveillance camera supports the generation part of this invention.

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that scope being determined solely by the appended claims. In particular the different features from different embodiments may be interchanged, where appropriate.

The invention claimed is:

1. A proxy for providing a standard manifest for requesting streamed timed media data associated with at least one media item, organized into temporal media segments, the streamed timed media data belonging to partitioned timed media data comprising timed samples, the streamed timed media data being transmitted as media segment files each comprising at least one independently processed component resulting from processing at least one of the timed samples, the proxy comprising at least one microprocessor configured for carrying out the steps of:

receiving an enhanced manifest comprising metadata for describing the processed components, the metadata comprising parameters used for describing at least a part of one of the processed components, wherein at least one of the parameters is a dynamic parameter which value can vary over time, the at least one parameter being associated with an element referring to a metadata resource which is external to the enhanced manifest and which comprises at least one value defining the at least one parameter;

determining which parameters are not resolved from the enhanced manifest as the at least one parameter; and generating a standard manifest based on metadata of the enhanced manifest and of the at least one value defining the at least one parameter, wherein the at least one parameter is resolved dynamically using remote information such that at least one parameter from the enhanced manifest may be dynamically re-evaluated without depending upon media presentation description.

2. A server for providing streamed timed media data associated with at least one media item, organized into temporal media segments, the streamed timed media data belonging to partitioned timed media data comprising timed samples, the streamed timed media data being transmitted as media segment files each comprising at least one independently processed component resulting from processing at least one of the timed samples, the server configured to:

generate and transmit an enhanced manifest comprising metadata for describing the processed components, the metadata comprising parameters used for describing at least a part of one of the processed components, wherein at least one of the parameters is a dynamic parameter which value can vary over time, the at least one parameter being associated with an element referring to a metadata resource which is external to the enhanced manifest and which comprises at least one value defining the at least one parameter;

transmit streamed timed media data on a request, called first request, based on metadata of the enhanced manifest and of the at least one value defining the at least one parameter, the enhanced manifest making it possible for a proxy to determine which parameters are not resolved from the enhanced manifest as the at least one parameter; and generate a standard manifest based on metadata of the enhanced manifest and of the at least one value defining the at least one parameter, wherein the at least one parameter is resolved dynamically using remote information such that at least one parameter from the enhanced manifest may be dynamically re-evaluated without depending upon media presentation description.

3. The server of claim 2, wherein the at least a part of the processed component and the metadata resource are to be transmitted in response to requests.

4. The device of claim 3, wherein said requests comprise said first request.

5. The server of claim 2, wherein the metadata of the enhanced manifest comprise a link enabling generating a dedicated request, called second request, for obtaining the metadata resource.

6. The server of claim 5, wherein the element referring to the metadata resource further comprises an identifier referencing a part of the metadata of the enhanced manifest, enabling identifying the link.

7. The server of claim 6, wherein the identifier is associated with the at least one parameter in the same part of the metadata of the enhanced manifest.

8. The server of claim 6, wherein the identifier belongs to a first part of the metadata of the enhanced manifest, the at least one parameter belonging to a second part of the metadata of the enhanced manifest, distinct from the first part, the identifier enabling establishing a relation between the first and the second parts.

9. The server of claim 3, wherein a request received for transmitting the metadata resource comprises a specific header, and wherein the at least one value defining the at least one parameter is defined in a specific header of a response that conforms to a client/server communication protocol, the response being transmitted in response to the request comprising the specific header.

10. The server of claim 2, wherein each of the processed components resulting from processing at least one of the timed samples is an encapsulated component resulting from encapsulation of at least one of the timed samples.

11. The server of claim 2, wherein the partitioned timed media data are tiled timed media data comprising at least one tile.

12. The server of claim 2, wherein the at least one value defining the at least one parameter defines a set of possible values of the at least one parameter.

13. The server of claim 2, further configured to, when receiving a first request indicating a selection of one value of the parameter, obtain an identifier for identifying a media item, and identify one or more parameter values when receiving one corresponding first request, and if at least one parameter value is identified, determine one or more timed samples of the processed components as a function of the identified value.

14. The server of claim 2, wherein at least two of the parameters are dynamic parameters which values can vary over time, each of the at least two parameters being associated with an element referring to a metadata resource which is external to the enhanced manifest and which comprises at least one value defining the corresponding parameter, a value of one of the at least two parameters being dependent on the value of the other one of the at least two parameters.

15. The server of claim 2, wherein at least one current value defining the at least one parameter is determined as a function of at least one previous value defining the at least one parameter.

16. The server of claim 2, wherein the at least one parameter represents width and/or height values of a video frame area.

17. The server of claim 2, wherein the at least one parameter represents a bandwidth of a video sequence.

* * * * *